March 24, 1942.    R. M. CHENOWETH ET AL    2,277,207
DICTATING MACHINE
Filed April 22, 1935    13 Sheets-Sheet 1
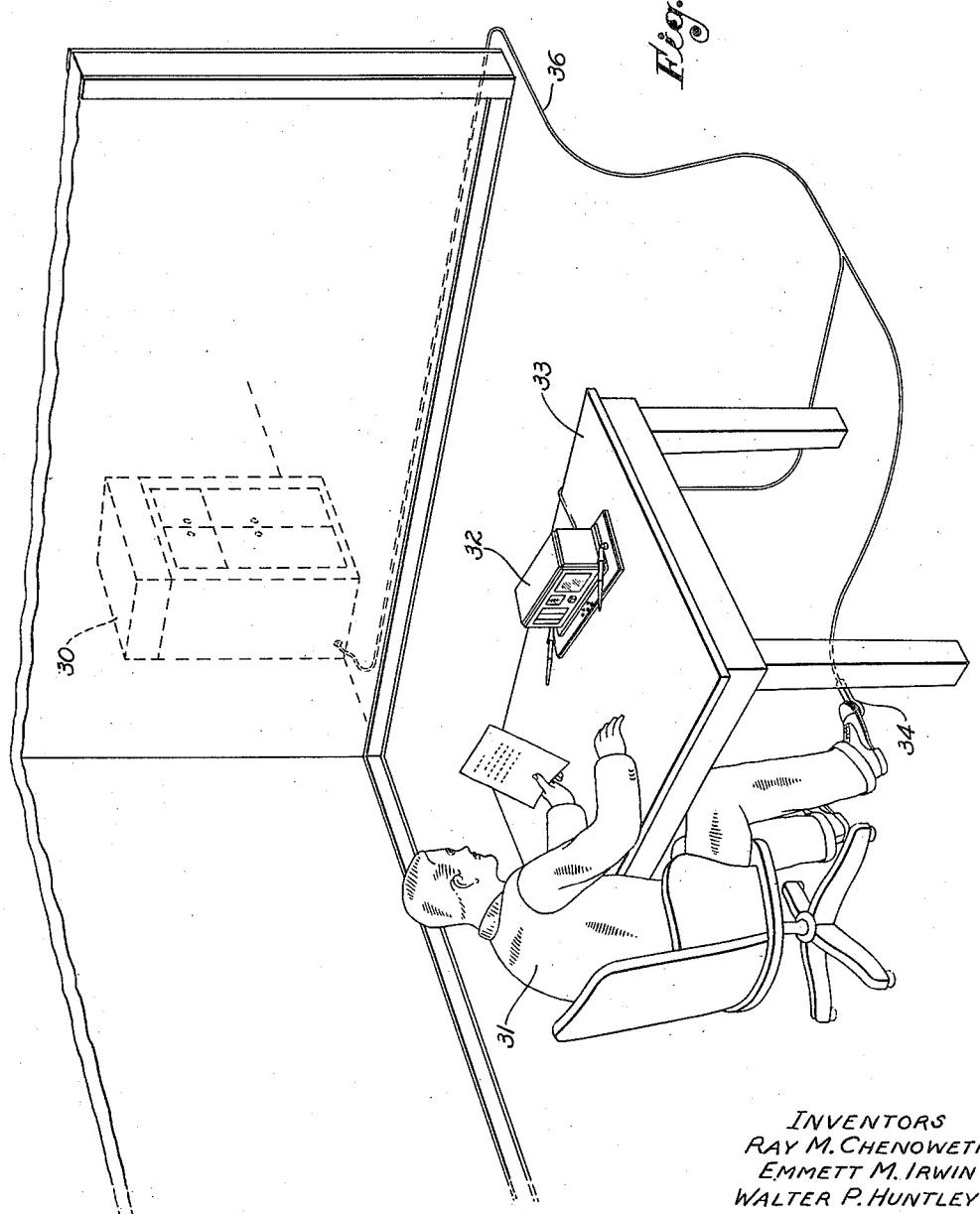
INVENTORS
RAY M. CHENOWETH
EMMETT M. IRWIN
WALTER P. HUNTLEY
BY Robert M. McManigal
ATTORNEY.

March 24, 1942.    R. M. CHENOWETH ET AL    2,277,207
DICTATING MACHINE
Filed April 22, 1935    13 Sheets-Sheet 2
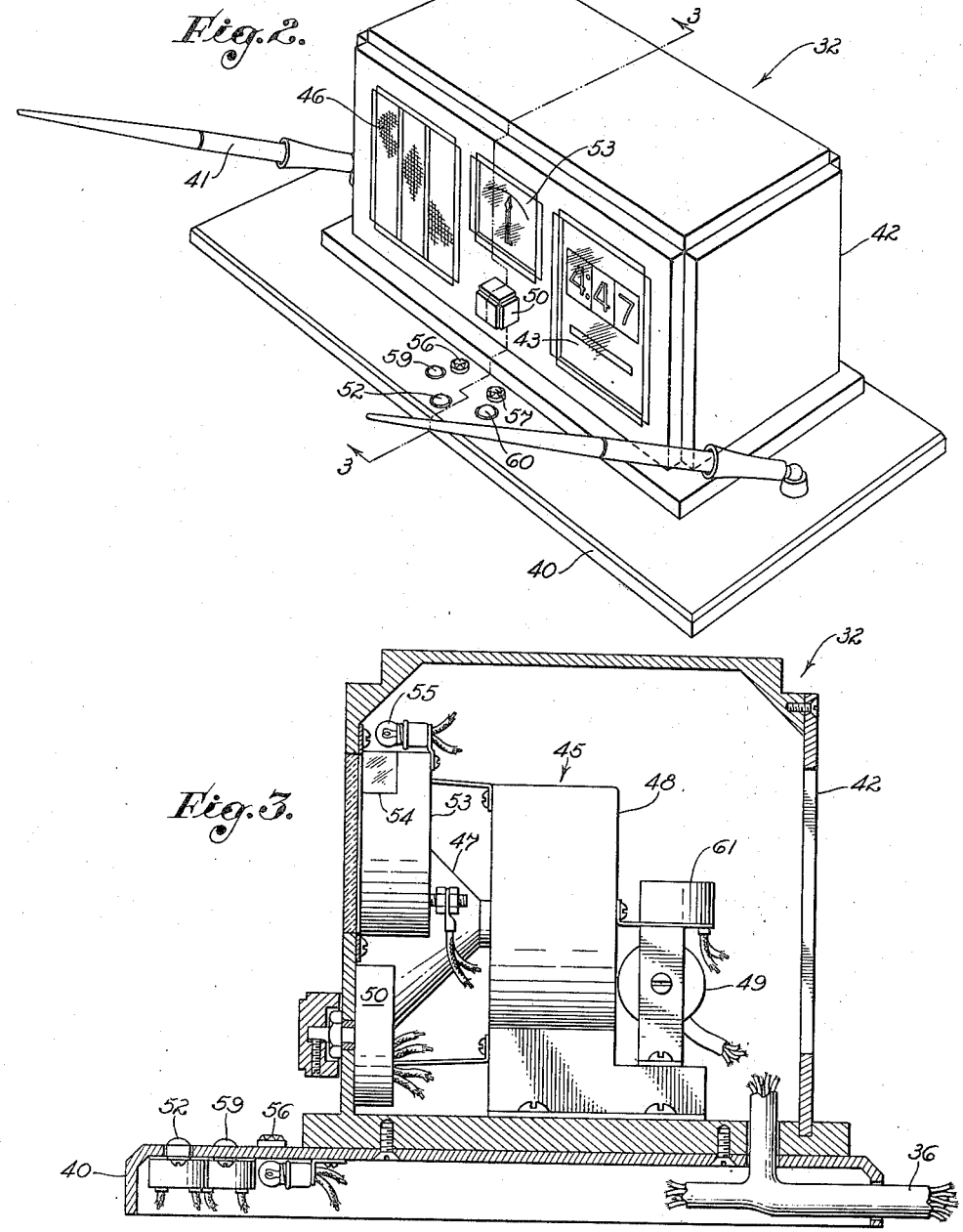
INVENTORS
RAY M. CHENOWETH
EMMETT M. IRWIN
WALTER P. HUNTLEY
BY Robert M. McManigal
ATTORNEY.

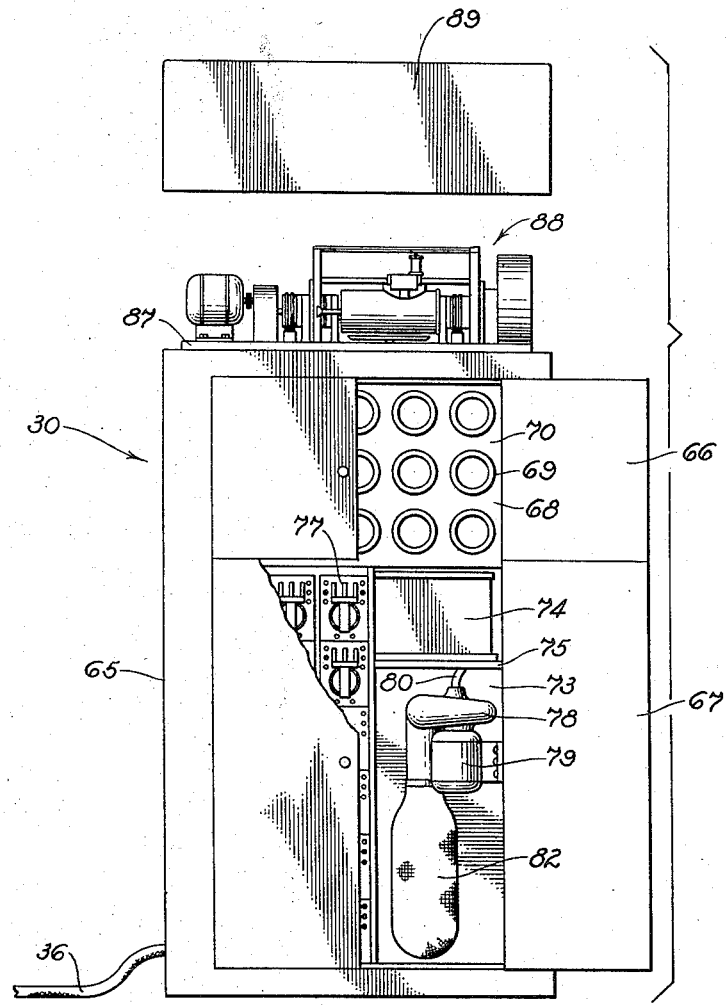

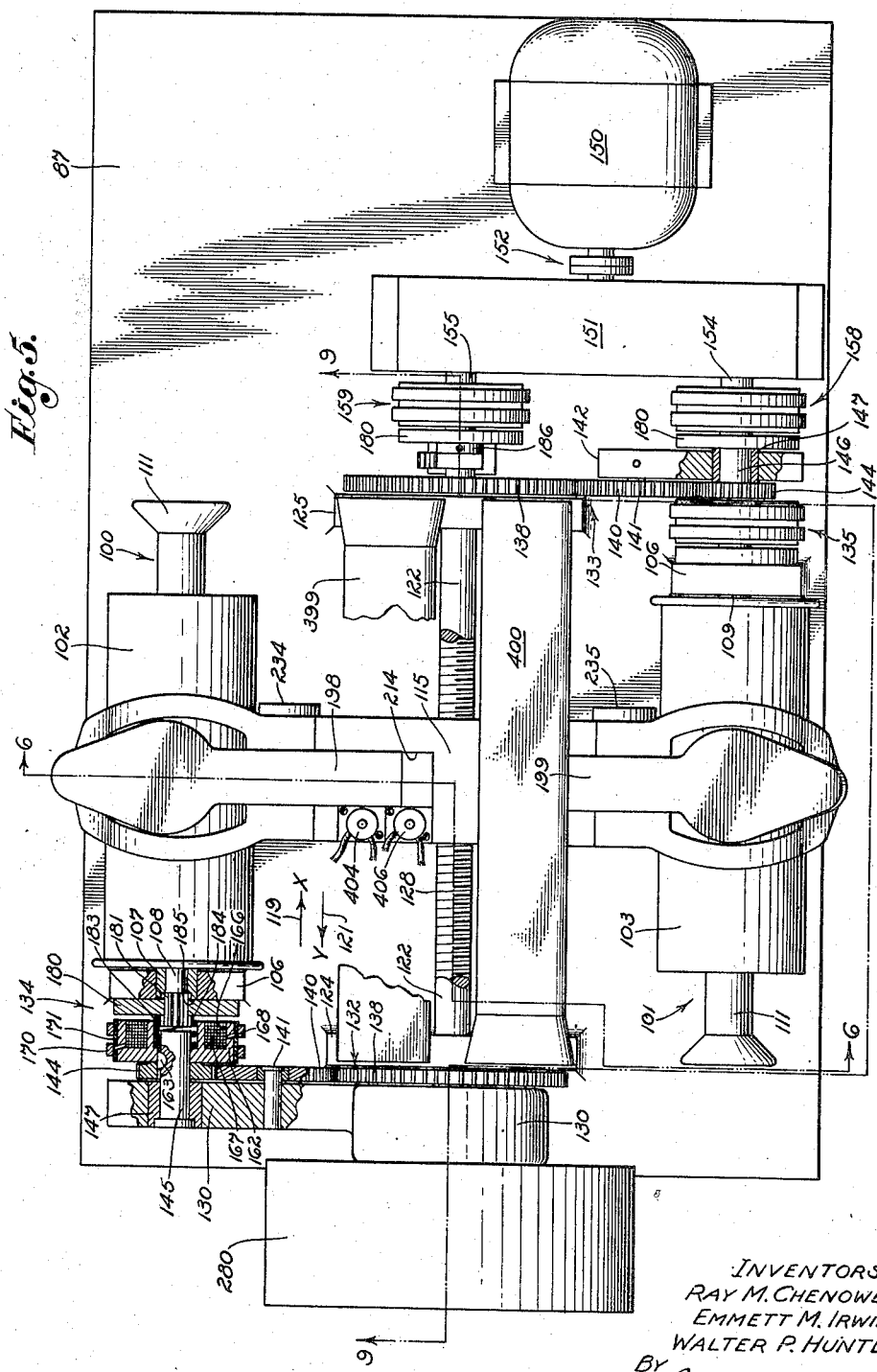

March 24, 1942. R. M. CHENOWETH ET AL 2,277,207
DICTATING MACHINE
Filed April 22, 1935 13 Sheets-Sheet 5
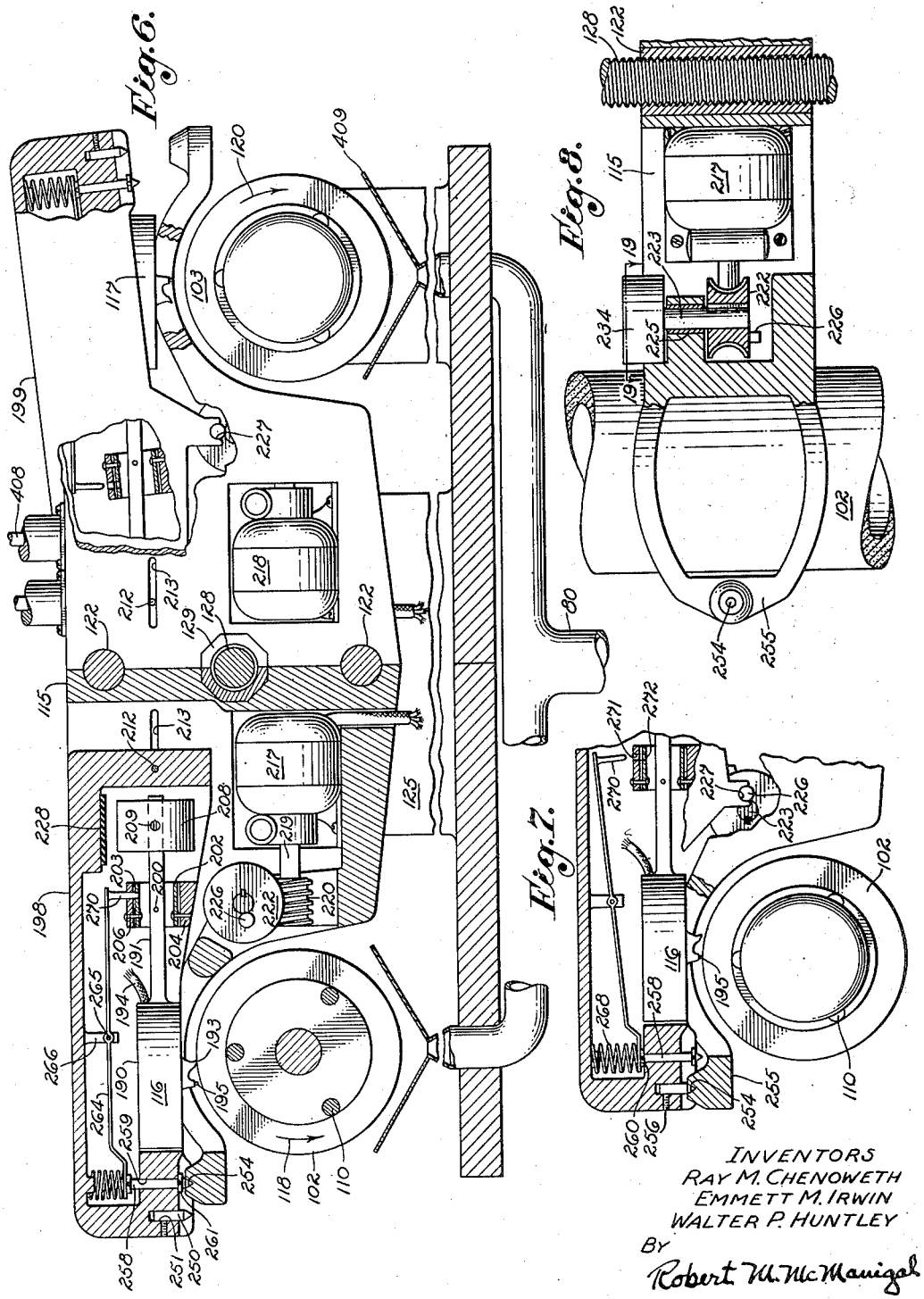
INVENTORS
RAY M. CHENOWETH
EMMETT M. IRWIN
WALTER P. HUNTLEY
By
Robert M. McManigal
ATTORNEY.

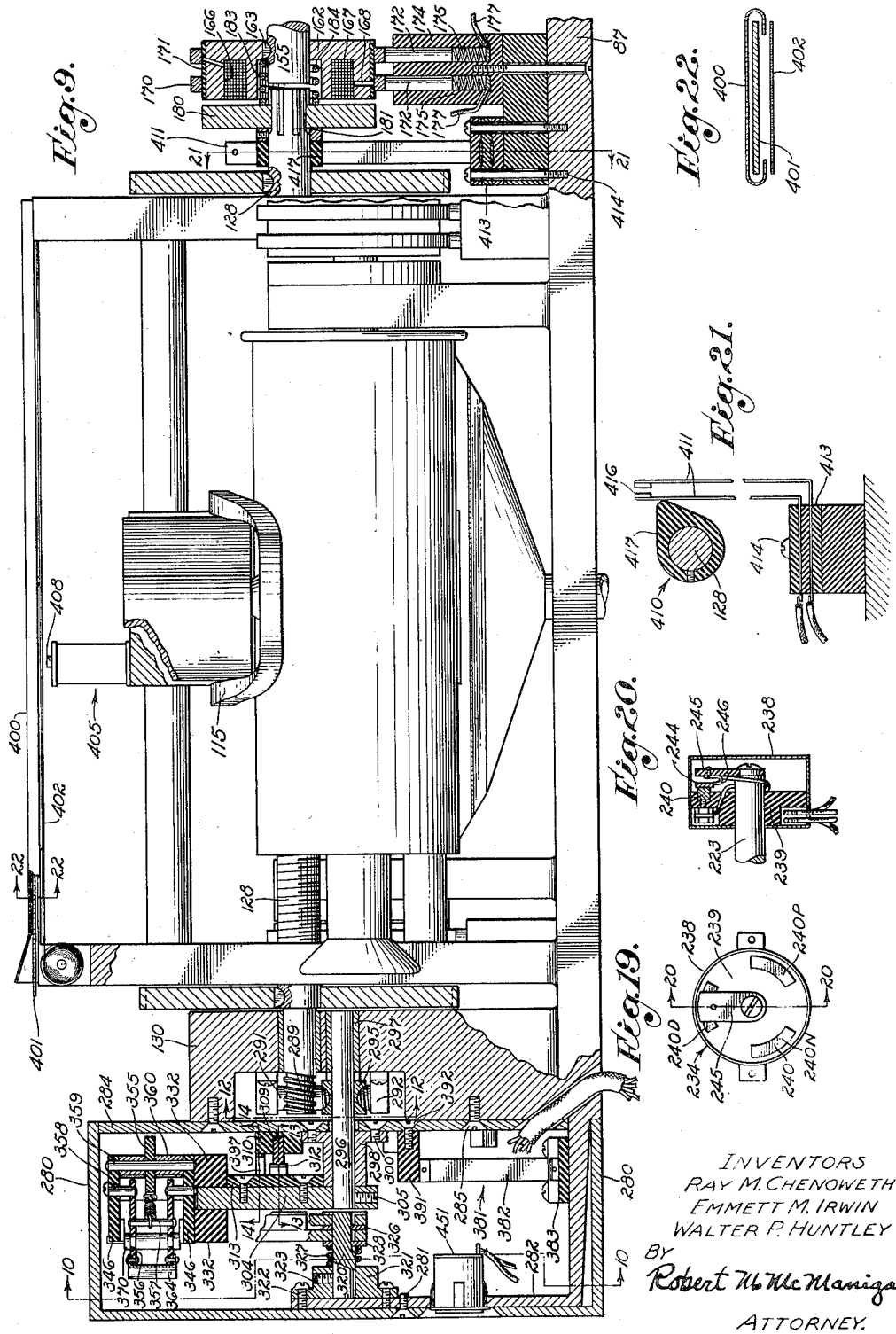

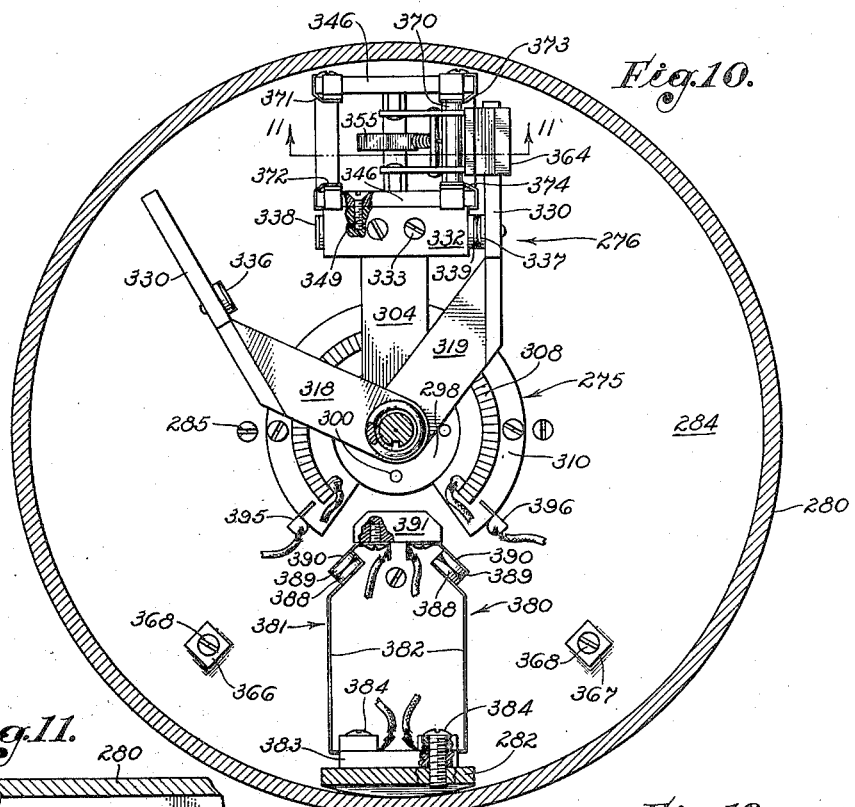
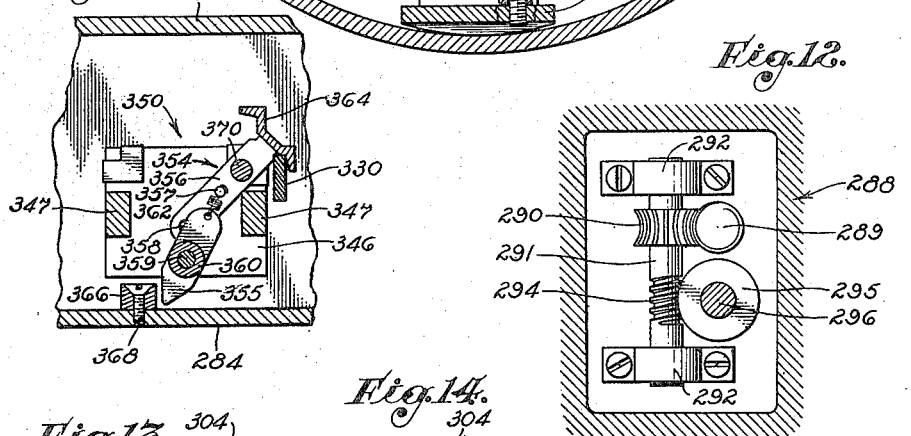
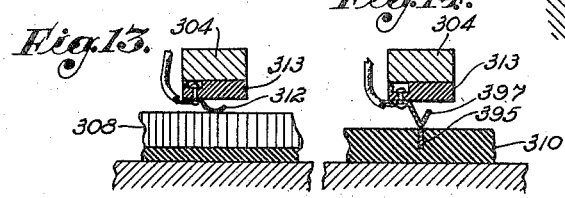

Fig. 15.
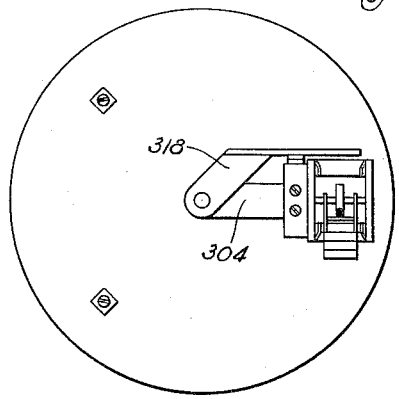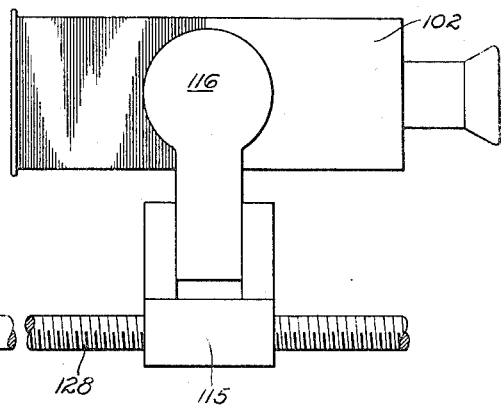
Fig. 16.
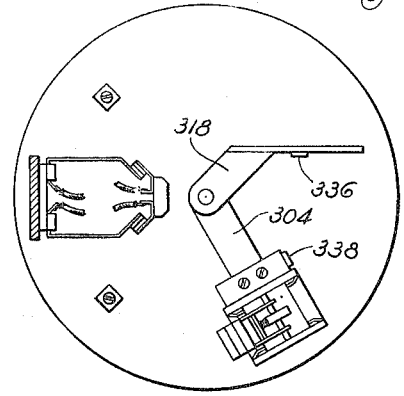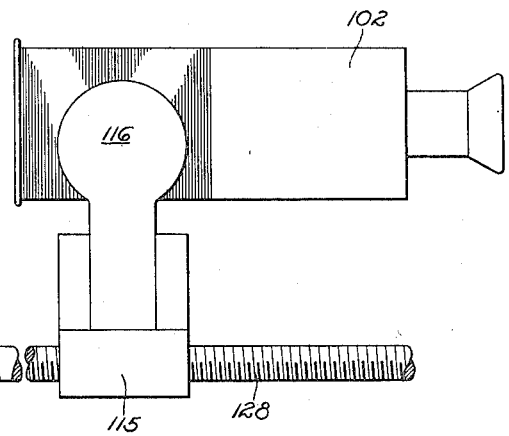
Fig. 17.
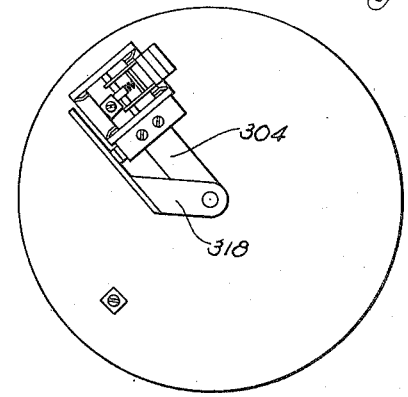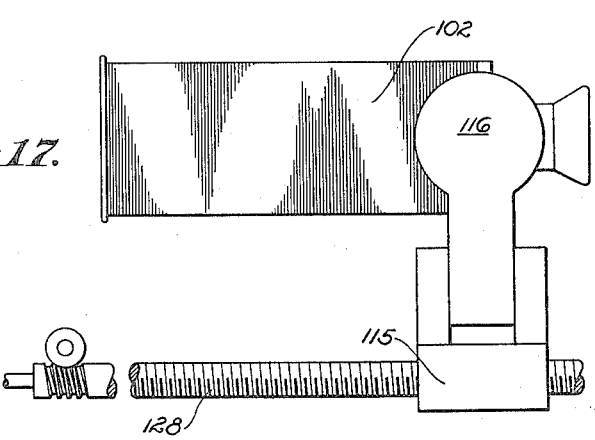
INVENTORS
RAY M. CHENOWETH
EMMETT M. IRWIN
WALTER P. HUNTLEY
BY Robert M. McManigal
ATTORNEY.

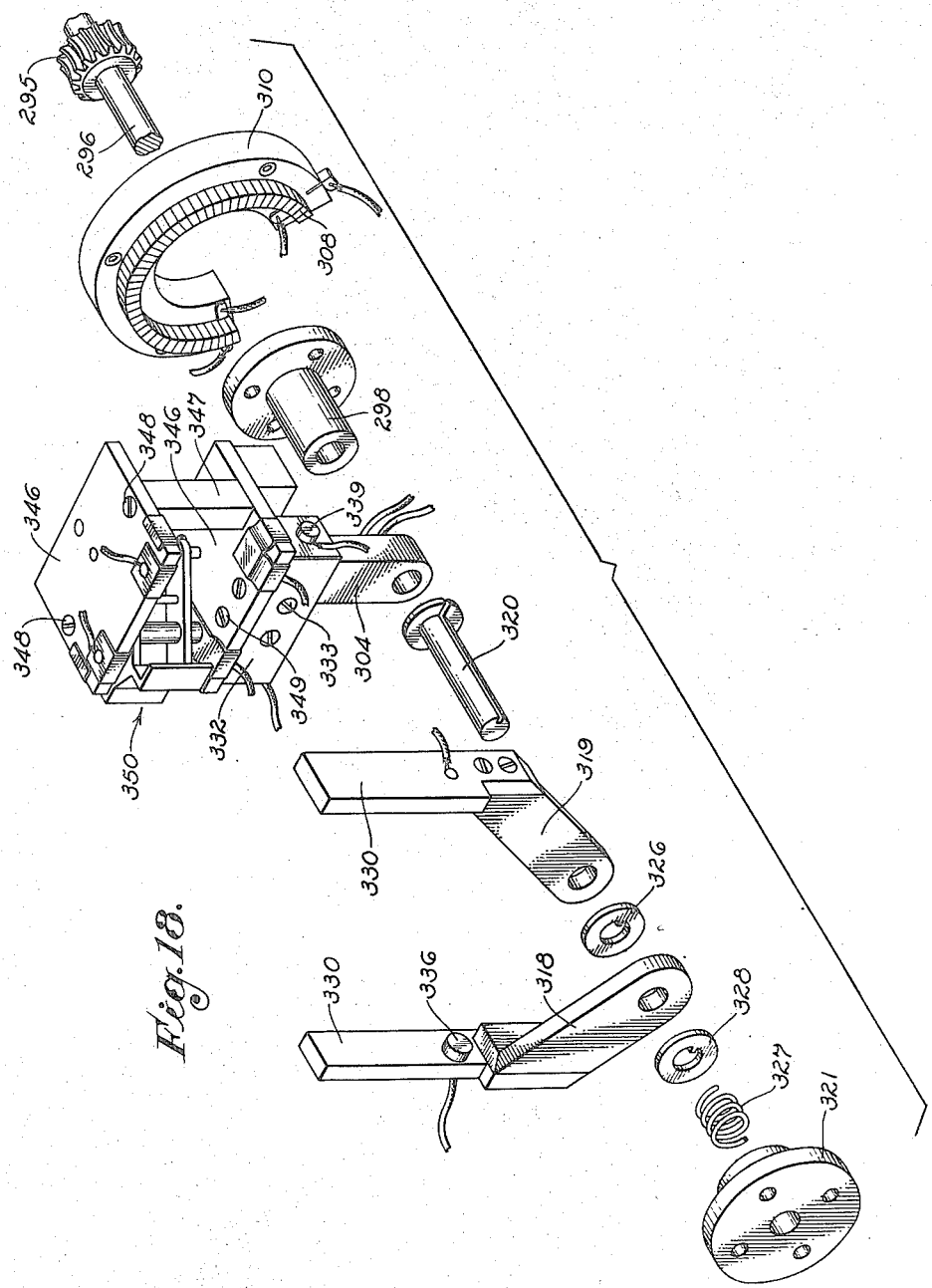

March 24, 1942. R. M. CHENOWETH ET AL 2,277,207
DICTATING MACHINE
Filed April 22, 1935   13 Sheets-Sheet 10
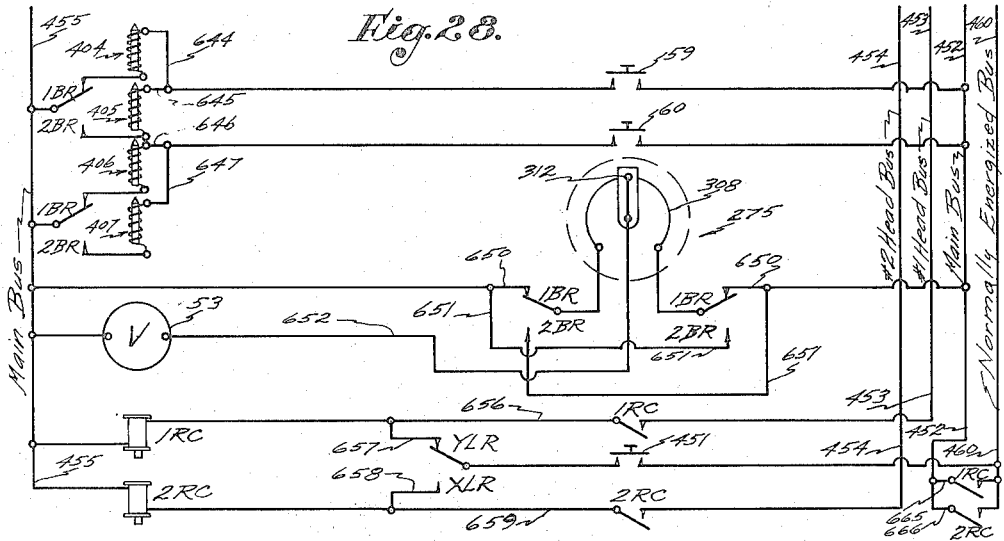
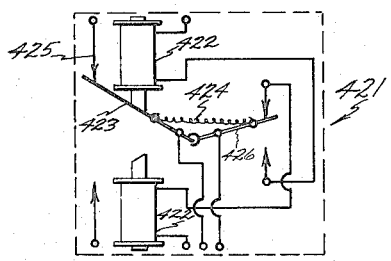
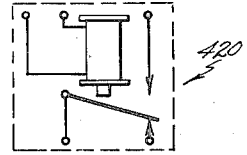
INVENTORS
RAY M. CHENOWETH
EMMETT M. IRWIN
WALTER P. HUNTLEY
BY Robert M. McManigal
ATTORNEY Patented Mar. 24, 1942

2,277,207

UNITED STATES PATENT OFFICE 2,277,207

DICTATING MACHINE

Ray M. Chenoweth, Los Angeles, and Emmett M. Irwin and Walter P. Huntley, Pasadena, Calif., assignors to C-W-B Development Co., Los Angeles, Calif., a corporation of California Application April 22, 1935, Serial No. 17,665

50 Claims. (Cl. 179—100.4)

Our invention relates broadly to a system for recording and reproducing sounds which finds particular utility where transcripts of said sounds are desired. It relates more particularly to devices for recording and reproducing dictation, conversations, testimony, etc., and finds particular utility in offices and like places.

At present the above results are accomplished through the aid of stenographers or dictating machines, which record the dictation for later transcription by a typist. Where dictating machines are used, these are usually placed on or near the desk of the dictator who dictates into a mouthpiece of the machine. The recording is accomplished by a mechanical-acoustic recording device which records on wax cylinders by the hill and dale method, the recording stylus also performing the grooving function on the record. A control handle is provided whereby the recording and reproducing device in the machine may be moved by the operator to a neutral position out of contact with the record, the carriage moved back over the recorded portion and then the reproducing device brought into contact with the record to reproduce the recorded dictation.

Several well known defects exist in present dictating machines. The quality of recording and reproduction is poor, the machines are cumbersome to operate and take up considerable space in an office. There is also no means provided for preventing the recording device being brought into contact inadvertently with a dictated portion of the record and thus regrooving the record and losing part of the dictation. Several other defects are also well known to those using these machines.

Stenographers may be satisfactory but they introduce extra expense in the operation of an office.

It is often desirable for the operator to have both hands free for the handling of papers, making notes, and so forth, during the dictation. The present machine requires that one hand be engaged with the tube in which the speaker must dictate in order to record the dictation. It is also sometimes desirable to record a two-way conversation. This is not practical with the present machine because of the necessity of providing two speaking tubes, or passing the speaking tube backward and forward between two persons, thus delaying the dictation.

It is also sometimes desirable to take down on a dictating machine conversations of one or more persons without their knowledge. This, of course, cannot be done with the present commercial dictating machine. There is also the element of speed in moving from record to record and in moving back for the purpose of playing back to the operator matter which had previously been recorded. With the present day commercial machine it is necessary for the operator to have the machine within arm's length so as to operate it. To play back material previously dictated, the operator must turn to the machine and operate a lever so as to put the machine into neutral position and move the head along the record to playback position. In other words, in order to play back material the operator has to make at least three separate motions after he has reached the machine, and after he has played back all that he desires he must again change the head from playback to neutral and carefully move the carriage back along the record to where he left off dictating and then move the lever to the dictate position. This consumes time and requires minute attention on his part.

It is a primary object of our invention to provide a dictating machine which may be placed remotely from the operator and to provide the operator with control devices with which he can perform all the necessary functions on the machine.

It is an object of this invention to provide a saving in expense and improvement in the operation of an office by providing a dictating machine which may be placed remotely from the operator where it may be attended by less highly paid members of an office for changing records, removing wax cut from the records, etc.

It is an additional object to provide a remotely controlled dictating machine which employs electrical recording and reproduction to increase the quality of the recorded dictation, this being accomplished in a manner described in a copending application Serial No. 828d filed January 8, 1935, by Ray M. Chenoweth and Vernice M. Bitz.

It is a further object to provide a remotely controlled dictating machine which reduces the amount of work which must be performed by the operator. We prefer to accomplish this object in a new and novel manner by making several of the functions automatic in their operation.

It is also an object to provide a machine of this class which may be moved to the recording, neutral and reproducing positions and back and forth relative to the record by a new and novel single control means situated remotely from the machine.

A further object is to provide a remotely controlled dictating machine which records the dictation so that it may be transcribed by a conventional transcribing machine, thus obviating the necessity of special transcribing machines.

Another object is to provide novel means for moving the recording and reproducing devices at a desired speed for recording and reproducing purposes and at a higher speed when in neutral and moving from one point to another on the record.

It is an additional object to provide a dictating machine in which several operations of the machine are accomplished by a single movement of the control device.

In accordance with the preceding object it is a further object to provide a dictating machine in which a single movement of the control device is effective in moving the recording device from recording position into neutral and the recording and reproducing devices back over the recorded portion of the record. A releasing or second movement of the control device is then effective in bringing the reproducing device into reproducing position.

It is also an object to provide a remotely controlled dictating machine in which the reproducing device may be brought into contact with the record at any desired place for reproducing the recorded dictation at that place.

It is a further object to provide a dictating machine in which a single motion of the control device is effective in moving the reproducing device from reproducing position into neutral, and a releasing movement is effective in moving the reproducing and recording devices over the recorded portion of the record and moving the recording device into recording position.

It is another object to provide in a dictating machine a novel device which registers the exact position where dictation was stopped so that if the recording device is moved, it may be returned to the exact position without the possibility of any of the recorded dictation being lost due to the recutting of the record or of a wasting of the record due to skipping an unused portion thereof.

It is an additional object to provide a position registering device of the above character which operates without attention from the operator.

Another object of the invention lies in the provision of a novel interlocking means to bring the recording device into contact with the record at the exact position indicated by the position registering device and which will not permit it to be brought into contact with the record at any other point.

It is a further object of the invention to provide an indicating means adjacent the operator which will enable the operator to see at a glance, the exact position and function being performed by the machine. This may include indicating means for showing the position of the recording and reproducing devices with respect to the length of the record, and for showing whether the machine is in recording, neutral or reproducing position, and for showing whether the machine is energized for operation and whether the record is turning during reproduction and recordation.

Another object is to provide new and novel means whereby the operator may remotely mark or indicate any portion of the record to which it is desired to call particular attention.

It is also an object to provide a remotely controlled dictating machine having a plurality of records and new and novel means for changing between records so that a substantially continuous dictation may be recorded.

A further object is to provide a dictating machine which is mechanically stronger and longer lived than commercial machines. In accordance with this object we have provided a single reversible drive means or screw for moving the recording and reproducing devices with respect to the record and have permanently engaged the screw with a nut in place of the conventional removable shoe or half-nut. In the commercial dictating machine a removable shoe is utilized which is moved from place to place on the screw which is used to move recording and reproducing heads along the record. This shoe is usually held in contact with this screw by a spring tension. Frequently the spring tension is not sufficient to prevent the shoe from slipping. A shoe of this type, being only a half-nut, does not have as much bearing surface on the screw as a nut and consequently is not as long lived.

It is also an object to provide means for removing the wax which is cut off the record by the recording device so that this wax does not interfere with the operation of the machine.

An additional object is to provide a novel method of remotely moving a combination recording and reproducing head carrying device into recording, neutral and reproducing positions and of locating the head carrying device rigidly in its position.

It is a further object to provide a means adjacent the operator whereby the intensity of the recorded dictation and the intensity of the reproduced sound undulations may be varied during recording and reproducing to adapt the dictating machine to various locations.

It is also an object to provide a new and novel means whereby the assistant who changes records may automatically reset the machine for future operation after the records have been changed.

It is an additional object to provide a device which automatically disconnects the machine from the source of operating power after it has been idle for a predetermined time.

It is a further object to provide a novel clutching device for clutching the recording medium into driving engagement with the driving means.

Our invention has many other advantageous features, some of which, of the foregoing will be set forth at length in the following description where we outline the form of the invention which we have selected for illustration of the drawings accompanying and forming part of the present specifications. In the drawings we have shown one form of our invention, but it is to be understood that we do not limit ourselves to such form or forms, since the invention, as explained in the claims, may be embodied in a plurality of forms.

Referring to the drawings:

Fig. 1 is a view showing the general arrangement of equipment when using a dictating machine of our invention.

Fig. 2 is a view showing the appearance of a control pad which is employed with the dictating machine.

Fig. 3 is a section taken on the line 3—3 of Fig. 2 showing the interior of the control pad.

Fig. 4 is an elevation of the dictating machine with some of the doors open to show the interior.

Fig. 5 is a plan view partially in section showing the recording and reproducing equipment.

Fig. 6 is a transverse section taken on the line 6—6 of Fig. 5, showing the construction of part of the recording and reproducing equipment.

Fig. 7 is a view taken similar to Fig. 6 with the equipment in a reproducing position.

Fig. 8 is a plan view partially in section, of part of the equipment shown in Fig. 6 with some of the devices removed to show the construction.

Fig. 9 is an elevation with sections taken as indicated by the line 9—9 of Fig. 5 to show additional construction features of the machine and the construction of a position registering device of our invention.

Fig. 10 is a section taken along the line 10—10 of Fig. 9 showing the position registering device.

Fig. 11 is a section taken as indicated by the line 11—11 of Fig. 10 showing the construction of a toggle mechanism used with the position registering device, but with the position registering device rotated near the end of its travel in one direction.

Fig. 12 is a section taken along the line 12—12 of Fig. 9 showing a gear reduction for driving the position registering device.

Fig. 13 is a section taken along the line 13—13 of Fig. 9 showing the construction of a variable resistance used with position indicating equipment of our invention.

Fig. 14 is a section taken as indicated by the line 14—14 of Fig. 9 to show the construction of a contact of an end of record indicating device.

Fig. 15 is a diagrammatic drawing showing the relative positions occupied by the position registering mechanism and other equipment when one record is being recorded.

Fig. 16 is a drawing similar to Fig. 15, but with the equipment in the reproducing position.

Fig. 17 is a drawing similar to Fig. 15, but with the recording medium full of dictation.

Fig. 18 is an exploded isometric view showing the relation of the parts of the position registering device.

Fig. 19 is a section taken on the line 19—19 of Fig. 8 showing a head position switch of our invention.

Fig. 20 is a section taken on the line 20—20 of Fig. 19 showing the construction of the head position switch.

Fig. 21 is a section taken on the line 21—21 of Fig. 9 to show a switching device employed with certain indicating equipment of our invention.

Fig. 22 is a section taken as indicated by the line 22—22 of Fig. 9 to show the construction of a portion of a marking device.

Fig. 23 is a diagrammatic drawing of a commercial type of impulse relay used for relaying the electrical circuits.

Fig. 24 is a diagrammatic drawing of a commercial type of magnetic relay which is used for relaying the electric circuits.

Fig. 28 is a wiring diagram forming a continuation of Fig. 27.

Figure 25:
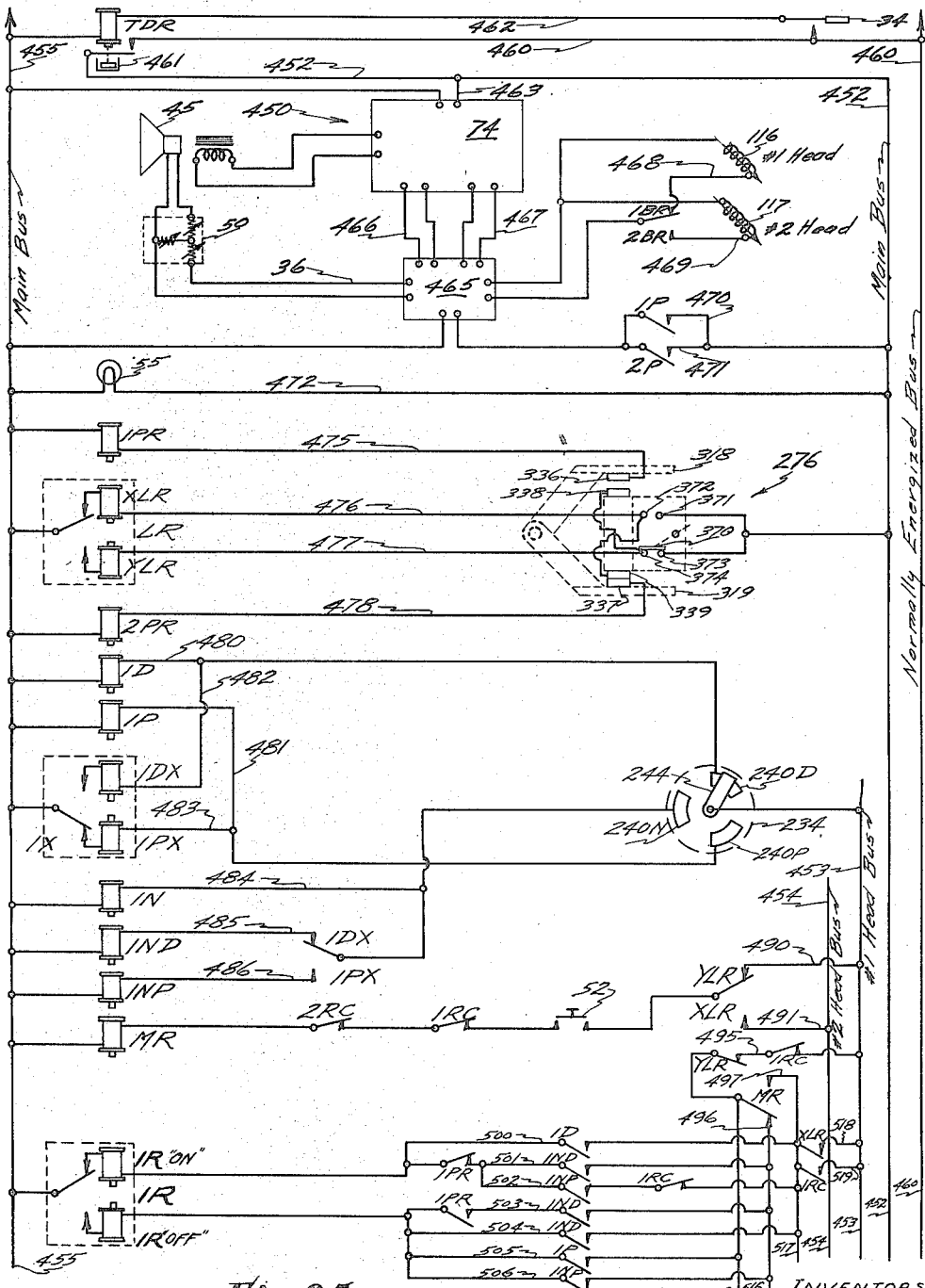
Fig. 25 is a wiring diagram showing the electric connections for a part of the equipment.
Figure 26:
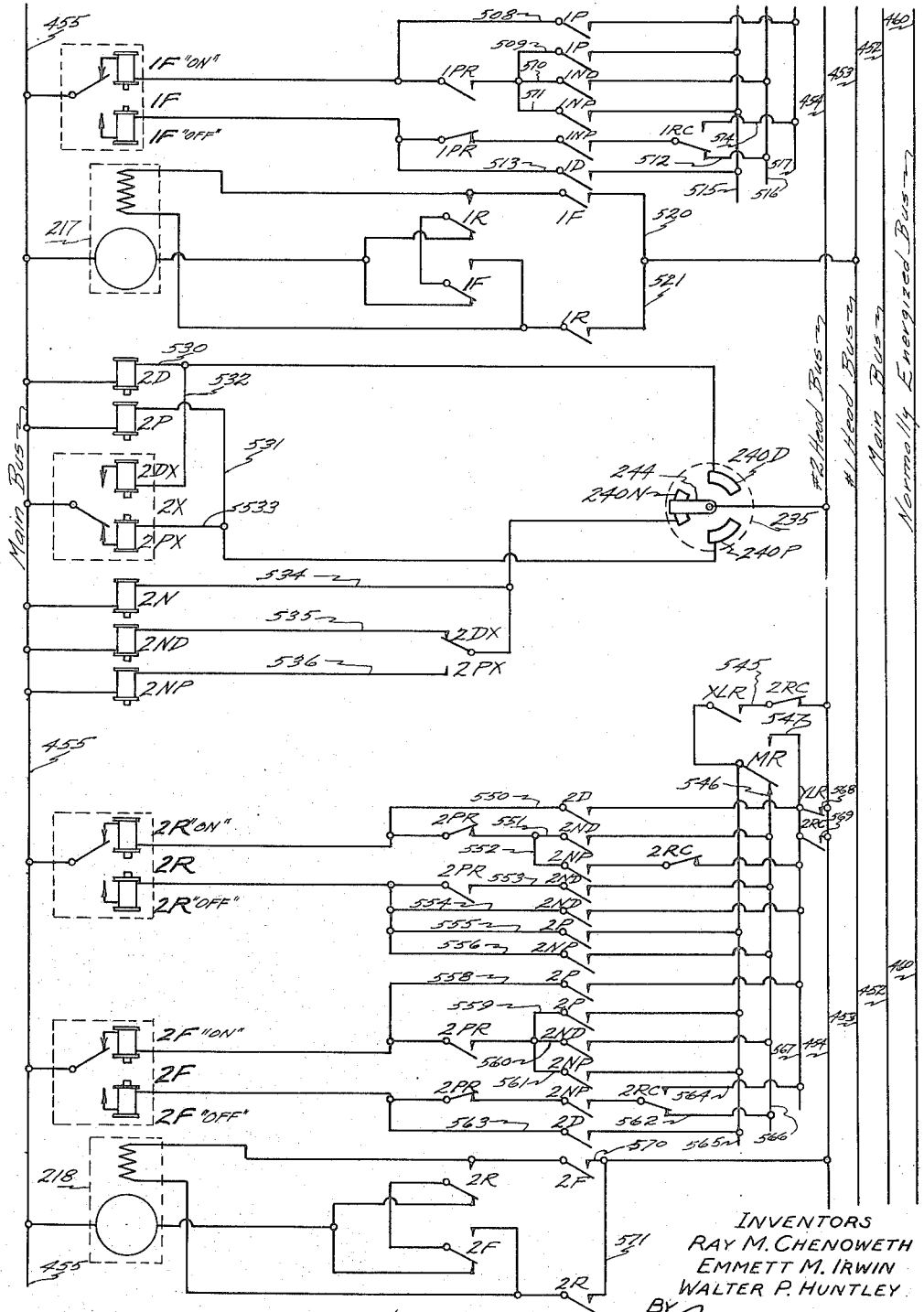
Fig. 26 is a wiring diagram forming a continuation of the wiring diagram shown in Fig. 25.
Figure 27:
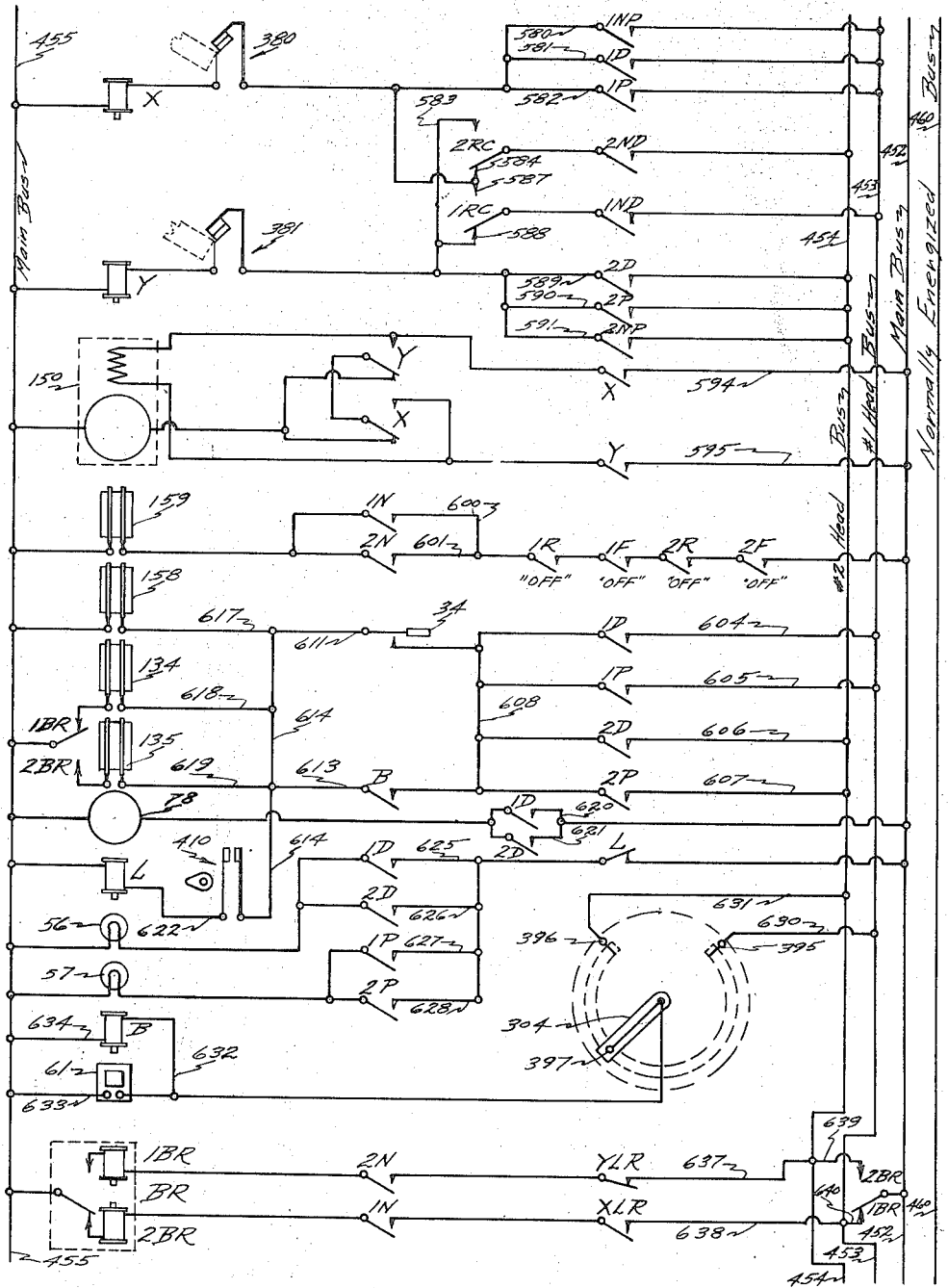
Fig. 27 is a wiring diagram forming a continuation of Fig. 26.

In accordance with the objects of our invention, we have provided a dictating machine indicated by numeral 30 in Figure 1, which is adapted to be remotely controlled by an operator 31. The machine 30 may be located in the same room with the operator 31 but is preferably located where it may be attended by other members of the office for changing records, etc. The control means whereby the operator may remotely control the machine 30 includes an ornamental control pad 32 which may be located on a desk or table 33 of the operator 31 for convenience in manually operating certain devices on the pad 32, and a foot switch 34 which is preferably placed underneath the desk or table 33 where it may be operated by the operator's foot. Both the control pad 32 and the foot switch 34 contain electrical devices which are connected to the machine 30 by a cable 36.

It will be noted that the appearance of an executive's office can be materially improved by removing a conventional dictating machine from the office and installing instead, a control pad of our invention which may be ornamented to conform to the furnishings of the office. The expense in operating the office is also reduced in that it is not necessary to have stenographers for taking dictation nor is it necessary for the executive to waste time by changing records, removing wax, etc. A further novel feature in removing the machine 30 from the office of the operator 31 lies in the fact that the machine may be operated to take down statements, etc., without the dictator's knowledge. It is particularly advantageous in legal offices where it is desired to record certain oral statements without obliging the dictator to dictate to a conventional dictating machine, or to have a stenographer present.

In addition to providing control for operating the machine 30, the control pad 32 may form part of a desk set which includes a base 40 and pens 41 (Figures 2 and 3). Mounted on the base 40 is an ornamental housing 42 which provides a hollow interior in one end of which a clock 43 may be installed for convenience. We have located in the housing 42 certain of the devices which operate with the dictating machine 30. These devices include the necessary equipment for receiving the sound undulations of the dictator's voice for recording on a recording medium, and the necessary equipment for reproducing the recorded dictation. The above equipment includes a sound responsive element which responds to the sound undulations and which translates the sound undulations into corresponding electric undulations, and a sound producing element which responds to electrical undulations for reproducing the recorded dictation.

We prefer to combine the sound responsive and sound producing elements into one device in the form of a dynamic loud speaker 45, for reasons set forth in copending application Serial No. 828d, but it should be understood that separate devices may be used if desired. The dynamic loud speaker 45 is placed at the rear of a grille 46 in the housing 42 and is preferably small in size and of conventional construction. The dynamic speaker 45 includes a cone 47 to which is attached a voice coil (not shown) mounted for movement in a magnetic field created by an electromagnet 48. When acting as a sound responsive element, the cone 47 of the dynamic speaker 45 moves in response to the sound undulations and produces corresponding electrical undulations in the voice coil in a well known manner. The electrical undulations are then transmitted over the cable 36 to the machine 30 for recording. Conversely, when the dynamic speaker 45 is used as a sound producing device, electrical undulations transmitted from the machine 30 over the cable 36 are applied to the voice coil and move the cone 47 to produce sound undulations in a well known manner. A conventional output transformer is located at the rear of the dynamic speaker 45 and is connected between the voice coil on the cone 47 and the wires of the cable 36 in a conventional manner.

In order to adjust the response of the dynamic speaker 45 to various locations and various operators, means is provided adjacent the operator 31 whereby the amount of power flowing between the wires of the cable 36 and the output transformer 49 may be regulated. This includes a "T" pad 50 of conventional type which is located in the lower center of the housing 42 and which is connected in the circuit in a conventional manner, such connection being more clearly shown in Figure 25.

As stated above the control pad 32 also includes control means whereby the operator 31 may control the operation of the dictating machine 30. Such control includes means whereby the machine 30 may be placed in the recording or reproducing position and means whereby it may be operated to record or reproduce at various points on the recording medium. In accordance with the objects of our invention we have combined the above control means in a single control device which comprises a push button 52 which is located in the base 40 of the control pad 32. The push button 52 operates to control the machine 30 in a novel manner to be more fully described in connection with the wiring diagram.

We have also provided in the control pad 32 certain indicating devices by means of which the operator 31 may know the function being performed by the machine 30. These devices include a position indicating device 53 located in the housing 42 above the "T" pad 50 which indicates the part of the recording medium which is being recorded or reproduced. The position indicating device 53 comprises a volt meter which is connected across a variable voltage source in the machine 30 in a manner to be more fully explained later in connection with the wiring diagram. A translucent window 54 is provided in the volt meter case through which light from a dial light 55 may illuminate the dial of the instrument.

Located in the base 40 are two indicating lights 56 and 57 which respectively indicate the recording and reproducing positions of the machine 30. Located in the base 40 also are two other push buttons 59 and 60 which are control devices by means of which the operator may indicate errors and the length of dictation to a transcribing operator. Located in the housing 42 above the output transformer 49 is an end-of-record buzzer 61 which indicates to the operator when a given record has been filled with dictation. The functions and operation of the above devices are explained in more detail hereinafter.

As shown in Figure 4, the dictating machine 30 is preferably enclosed for appearance and to exclude dust, and includes a cabinet 65 provided with swinging access doors 66 and 67. The upper swinging access doors 66 give access to a storage space 68 in which cylindrical records 69 may be stored, the records being slidable into cylindrical troughs (not shown) suspended from a face plate 70. The lower access doors 67 give access to a space 73 in which certain of the equipment for operating the dictating machine 30 is located. This equipment includes a vacuum tube amplifier 74 which is used with the dynamic speaker 45 to amplify the electric undulations thereof in a well known manner and which may be located on a shelf 75 in the compartment 73. In one side of the compartment 73 is a relay rack 77 on which certain relays which control the equipment are located. In another portion of the compartment 73, a vacuum fan 78 is located, this fan being used to remove the cuttings from the records when recording, as explained more fully later. The fan 78 is driven by a motor 79 and acts to withdraw air and cuttings through a tube 80 and discharge them into a porous bag 82 which retains the cuttings, but permits the air to escape. The bag 82 is preferably made removable from the machine 30 so that an attendant may empty the wax cuttings.

At the top of the cabinet 65 is a base 87 on which a recording and reproducing machine 88 is located. This machine 88 is normally enclosed by a removable cover 89 which is attached to the cabinet 65 and which may be removed so that records may be installed or withdrawn from the machine 88.

Record drive

As previously stated, we prefer to employ cylindrical wax records as the recording medium and to provide a machine capable of using a plurality of these records. We further prefer to construct our machine 88 so as to use records which are commercially available for dictating machines and to record on these records so that they may be later transferred to a commercial transcribing machine for transcription by a typist.

The machine 88 is accordingly provided with two mandrels 100 and 101 (Figure 5), which are adapted to receive thereon commercial wax records, 102 and 103. The mandrels 100 and 101 are rotatably supported from the base 87 by bearing posts 106 which have bearings 107 for journaling shafts 108 and 109 of the mandrels 100 and 101 The mandrels 100 and 101 are located on opposite sides of the base 87 with their axes parallel and ends of the records 102 and 103 in alignment. The mandrels 100 and 101 are further positioned on the base 87 so that the open ends thereof, that is, the ends on which the records 102 and 103 are inserted or removed, face opposite ends of the base 87. The reason for this arrangement of the mandrels 100 and 101 on the base 87 will be apparent later.

The mandrels 100 and 101 may be any suitable type, but we prefer to use a type commonly used with one style of commercial dictating machine. This type of mandrel used includes rods 110 (Figure 6) on which the cylindrical wax records 102 and 103 may be removably positioned. The rods 110 may be collapsed towards their axes of rotation by pushing on handles 111 extending from the open end of the mandrels 100 and 101 to permit installation or removal of the records 102 and 103 in a manner well known in the art.

In order to record on the records 102 and 103 so that they may be later transcribed through the use of a commercial transcribing machine, it is necessary to cut a sound track on the records 102 and 103 in the form of a right hand helix. It is also necessary to start the recording on the end of the records 102 and 103 adjacent the closed ends of the mandrels 100 and 101. We have therefore located the mandrels 100 and 101 on the base 87 in a manner previously explained so that recording on both records 102 and 103 may be accomplished by a single carriage 115 which carries suitable recording and reproducing devices, such as electric recording heads 116 and 117 (Figure 6), for recording on and reproducing from the records 102 and 103 We further provide suitable equipment as will be explained later for rotating the records 102 and 103 and moving the carriage 115 along the records. When recording, we rotate the record 102 in a direction as indicated by arrow 118 in Fig. 6 and advance the carriage 115 in an "X" direction as indicated by an arrow 119 in Fig 5. Likewise when recording on record 103 we rotate it as indicated by arrow 120 (Figure 6) and advance the carriage in a "Y" direction as indicated by arrow 121 (Figure 5), this being the necessary movement to secure proper recording.

It should be noted that the arrangement of the mandrels 100 and 101 with the open ends thereof facing in opposite directions permits recording to be accomplished with the carriage 115 moving in the "X" direction when recording on the record on mandrel 100 and in the "Y" direction when recording on the record on mandrel 101. It is possible for the machine 88 to record substantially continuous dictation by replacing the records as they become full of dictation. The carriage 115 moves in one direction while recording on the record on mandrel 100, transfer being made to the record on mandrel 101 when the record on mandrel 100 is full of dictation, and the carriage 115 moved in the reverse direction while recording on the record on mandrel 101, transfer being again made to the record on mandrel 100 when the record on mandrel 101 is full of dictation and so on.

In its movement back and forth along the records 102 and 103 the carriage 115 is slidably supported by means of guide rods 122 which are in turn supported on posts 124 and 125 formed on the base 87. Movement of the carriage 115 along the guide rods 122 is accomplished by a drive member or advancing screw 128 which engages a threaded nut 129 (Figure 6) in the carriage 115. The advancing screw 128 is journalled by suitable bearings carried in the post 125 and a post 130 which is positioned on the base 87 adjacent to post 124.

It is customary in dictating machines to connect the advancing screw to the shafts which drive the mandrels by means of gears so that the sound track formed on the records is accurately spaced. We have accordingly provided two gear trains 132 and 133 (Fig. 5) which drivably connect opposite ends of the advancing screw 128 to the shafts 108 and 109 of the mandrels 100 and 101 through electrical record clutches 134 and 135 which are respectively associated with mandrels 100 and 101. The gear trains 132 and 133 comprise large gears 138 which are attached to opposite ends of the advancing screw 128 and which mesh with idler gears 140. The idler gears 140 are rotatably supported on shafts 141 carried by the posts 130 and 142, and are retained in place by upset heads on the shafts 141. The idler gears 140 in turn mesh with smaller gears 144 which are keyed to counter shafts 145 and 146 that are co-axial with the mandrel shafts 108 and 109. The counter shafts 145 and 146 are rotatably supported by bushings 147 secured in the posts 130 and 142 and are drivably connected to one part of the electric clutches 134 and 135, the other part being connected to the mandrel shafts 108 and 109 so that upon energization of either of the clutches 134 or 135 the mandrel associated with that clutch is operatively connected through its associated gear train to the advancing screw 128.

It should be noted that if the records 102 and 103 are later to be used in a commercial transcribing machine, the pitch of the sound track thereon should be approximately 180 turns per inch as this is the approximate pitch used in commercial machines. We have shown our machine 88 as obtaining this result in the same manner as commercial machines, namely, using a three to one ratio in the gear trains 132 and 133, and a sixty thread per inch advancing screw, but it should be understood that other combinations may be satisfactorily used. This is particularly true of a machine of our invention since the recording and reproducing head 116 or 117 may be spotted on record 102 or 103 to micrometer accuracy by rotating the advancing screw 128.

By increasing the gear ratio between the mandrels 100 and 101 and advancing screw 128, a coarser and more rugged thread may be used on the advancing screw 128 as contrasted with the fine thread which must be used on commercial machines where the advancing screw is drivably contacted by a removable shoe or half nut. Adjustment in the latter case is limited to the distance between two threads or approximately one sixtieth of an inch, corresponding to three revolutions of record 102 or 103.

Power for rotating the records 102 and 103 and advancing the carriage 115 is furnished by a reversible drive means which includes a constant speed, reversible motor 150. The motor 150 is attached to the base 87 and connected to the mandrels 100 and 101 and the advancing screw 128 by suitable gearing and electric clutches. The gearing includes an enclosed gear-box 151 which is driven by the motor 150 through a coupling 152, and which provides a slow speed shaft 154 and a high speed shaft 155. Power from the slow speed shaft 154 is used to drive the records during the recording and reproducing process and power from the high speed shaft 155 is used in moving the carriage 115 rapidly along the records 102 and 103 when it is desired to move the heads 116 and 117 to new positions on the records 102 and 103. It is obvious that various speeds on these shafts 154 and 155 may give satisfactory results, but we have found that a speed of 45 R. P. M. for the slow speed shaft 154, and a speed of 600 R. P. M. for the high speed shaft 155 is desirable.

Associated with the slow speed shaft 154 is a slow speed clutch 158 which is operatively connected with an extension of the countershaft 146 so that upon energization of the slow speed clutch 158, the lead screw 128 will be rotated at slow speed, through the gear train 133, and the carriage advanced along the records 102 or 103. If the motor 150 is rotating to advance the carriage in the "X" direction, the energization of the record clutch 134 will then cause the record 102 associated with the clutch 134 to rotate in a direction indicated by arrow 118 (Fig. 6) and at a speed suitable for recording and reproducing. Conversely a reversal of the motor 150 will cause the carriage 115 to advance in the "Y" direction and the energization of the clutch 135 will cause record 103 to rotate in the direction indicated by arrow 120 (Figure 6) for recording or reproducing.

Likewise associated with the high speed shaft 155 is a high speed clutch 159 which is operatively connected to the advancing screw 128 so that upon energization of the high speed clutch 159, the advancing screw 128 will be operated at high speed to move the carriage 115 at high speed along the records 102 and 103. The reversible motor 150 in conjunction with the high speed clutch 159 permits the carriage 115 to be moved rapidly in either direction along the records 102 and 103.

Record clutches 134 and 135 are identical in construction and include electro-magnets 162 (Fig. 5), which are keyed to the shafts 145 and 146 as by keys 163. The electro-magnets 162 provide annular grooves 166 in which coils 167 are secured. The terminals of the coils 167 are connected through holes 168 in the electro-magnets 162 to slip-rings 170, supported on insulating collars 171 around the electro-magnets 162. As shown in Fig. 9, brushes 172 are held in insulating guides 174 attached to the base 87, and are normally forced into engagement with the slip-rings 170 by springs 175. Electrical connection for energizing the clutches is made to the brushes 172 as by wires 177.

When energized the electro-magnets 162 (Fig. 5) attract armatures 180 and hold them in contact therewith so that power may be transmitted from the electro-magnets 162 to the armatures 180. The armatures 180 are slidable on splines 181 formed on the mandrel shafts 108 and 109 so that they may be moved into or out of engagement with the electromagnets 162, and when in engagement with the electro-magnets 162 may transmit power to the mandrel shafts 108 and 109. The armatures 180 are normally maintained out of engagement with the electro-magnets 162 by springs 183 which are retained in annular grooves 184 in the electro-magnets 162. The springs 183 also normally force the armature 180 into engagement with flat surfaces 185 of the bearing posts 106 so that a braking action occurs between the armatures 180 and the bearing posts 106 when the electro-magnets 162 are de-energized. This produces quick stopping of the records 102 and 103 when the clutches 134 and 135 are de-energized.

Clutches 158 and 159 are identical with clutches 134 and 135, except that these clutches 158 and 159 are electric clutches only and not a combination electric clutch and electric brake, as are the electric clutches 134 and 135.

In the case of clutch 158 the non-braking action is obtained by extending the bushing 147 a slight distance beyond the face of the post 142 so that the armature 180 of the electric clutch 158 does not contact the post 142 and cause a braking action. In the case of the electric clutch 159, the non-braking action is obtained by attaching a collar 186 to the advancing screw 128 so that the armature 180 of clutch 159 is held against the collar when the clutch 159 is de-energized.

We have found that the particular type of electrical clutches which we have described above are particularly adapted for use in dictating machines. These clutches are particularly compact so that little space is taken for the operating equipment for the clutches. Further, the armatures and magnets of the clutches may be positioned quite close together so that very little movement of the armature is necessary to engage the clutches. This permits the engagement of the clutches without a jar, which is desirable in that a jar would disturb the recording mechanism and produce an objectionable sound when played back. The engagement of the clutches is also not positive but depends upon friction between the armatures and the magnets. This permits a slight slippage therebetween while the parts are accelerating, and thus prevents high stresses in the equipment.

This type of clutch also lends itself particularly well to braking as shown above. In commercial dictating machines, quick stopping of the records and equipment is obtained by a friction drag which is engaged at all times, even when the records are rotating for recording or reproducing. This places an extra load on the driving motor which is not present with the type of clutches which we have illustrated, where the braking device is out of engagement when the clutches are engaged.

While we have illustrated a type of record drive which is particularly well adapted for driving a dictating machine of our invention, we are aware that various other types of drives may be used and we do not wish to be limited to the particular type of drive which we have illustrated. The aforementioned record drives may be hereinafter referred to as primary drive means.

Head drives

Referring to Figs. 5 to 8 we have shown certain driving equipment for moving the recording and reproducing heads 116 and 117, this equipment being termed head drives. For convenience in referring to the heads 116 and 117 in connection with the wiring diagram (Figs. 25 to 28) we also refer to the heads 116 and 117 and their drives as head #1 and head #2 respectively. It is not intended that the above numbering of the heads should indicate a preference in their operation as machine 88 is dual in character and recording with either head may be started first depending on the setting of the machine when recording is started.

We have found that the type of head drives which we have illustrated is particularly adapted for moving the heads 116 and 117 by a power driving system, such a system being adaptable for remote control. It should be understood that we do not wish to be limited to the particular head drives which we have shown as other satisfactory drives may be evident to those skilled in the art. We also refer to the head drives as secondary drive means.

Referring to Figs. 5 and 6, we have shown the recording and reproducing heads 116 and 117 as being of the electric type similar in construction to those described in the copending application Serial No. 828d, but it is obvious that other types of heads may also be used. In heads 116 and 117 the recording and reproduction are accomplished by separate styli on the same head, but our invention comprehends the use of several types of heads, whether such heads employ a single or a plurality of styli on the same head or whether separate recording and reproducing heads are used. We have broadly termed such heads a translation means operable between the recording medium and a propagating medium to transmit undulations in at least one direction therebetween. The heads 116 and 117 illustrated include housings 190 having extending arms 191. The housings 190 enclose the electrical equipment which moves recording styli 193 up and down in response to electrical undulations applied to terminal wires 194. The same electrical equipment is effective in producing electrical undulations on the wires 194, resulting from a movement of the reproducing styli 195 as is well known in the art.

The heads 116 and 117 are mounted inside hollow head carriages 198 and 199 supported by the carriage 115, so that the heads 116 and 117 may pivot about horizontal and vertical axes, the horizontal pivoting being accomplished by horizontal pins 200 on the arms 191, the pins 200 being pivoted in cupped screws (not shown) threaded into sleeves 202. The sleeves 202 are loosely received into openings 203 in transverse web portions 204 of the head carriages 198 and 199 and are pivoted therein by vertical pins 206 engaging the sleeves 202 and the web portions 204. The fit between the sleeves 202 and the openings 203 in the web portions 204 is made such that only a limited horizontal movement of the heads 116 and 117 is permitted, this movement being only sufficient to permit the reproducing styli 195 to follow the sound tracks on the records 102 and 103 during reproduction.

Adjustable counterweights 208 are secured by screws 209 to the arms 191 to partially counterbalance the weight of the heads 116 and 117 so that the heads 116 and 117 bear on the records 102 and 103 with the proper weight. The head carriages 198 and 199 are mounted in the carriage 115 so that they may be moved to bring the heads 116 and 117 into a recording position substantially as shown by head 116 in Fig. 6, in which its recording stylus 193 is in contact with the record 102. The head carriages 198 and 199 may also be moved into a neutral or nonoperating position as shown by head 117 (Fig. 6) in which the recording and reproducing styli 193 and 195 do not contact the record 103, and into a reproducing position substantially as shown by head 116 (Figure 7) in which its reproducing stylus 195 is in contact with the record 102. These three positions are also commonly referred to as dictate, neutral and playback positions.

The mounting for the head carriages 198 and 199 includes pins 212 (Figure 6) attached to the rear portion of the head carriages 198 and 199. The pins 212 are slidable in horizontal slots 213 in the carriage 115, the slots 213 being sufficiently long to permit movement of the head carriages 198 and 199 between the recording or forward position and the reproducing or retracted position. As shown in Figure 5, the rear portion of the head carriages 198 and 199 are slidable in guide openings 214 formed in the carriage 115 so that the head carriages 198 and 199 are maintained in alignment during their movement from one position to another.

Power for moving the head carriages 198 and 199 is provided by geared reversible motors 217 and 218 (Figs. 6 and 8) mounted in recesses in the carriage 115. Attached to slow speed shafts 219 of the motors 217 and 218 are worms 220 which mesh with worm gears 222 secured to shafts 223 journaled in bushings 225 in the carriage 115. Attached eccentrically to the worm gears 222 are pins 226 which upon rotation of the shafts 223, engage slots 227 formed in the head carriages 198 and 199 and act to move the head carriages 198 and 199 from one position to another.

This action is more clearly seen by referring to Figure 7, in which one of the pins 226 is shown in position to engage one of the slots 227, the head 116 being in the reproducing position. If the motor 217 is now energized to rotate the worm gear 222 associated therewith in a counter-clock-wise direction, the pin 226 will carry that portion of the head carriage 198 which is adjacent to slot 227 in a forward arc and the rear portion of the head carriage will move horizontally forward due to engagement of the pin 212 in the slot 213. This causes a combined rising, translation and lowering movement of the head 116.

As the head 116 is raised, it tends to pivot about the pins 200 due to the unbalanced weight thereof, this movement being arrested by the counterweight 208 striking a rubber pad 228 attached inside the head carriage 198, a similar rubber pad being attached inside the head carriage 199. The reproducing stylus 195 is then lifted clear of the record 102 and moved slightly forward to a neutral position as shown by head 117 in Figure 6. Further movement of the worm gear 222 then moves the head 116 forward and lowers the recording stylus 193 onto the record 102 as shown by head 116 in Figure 6, the counterweight 208 then being out of contact with the rubber pad 228. If it is desired to move the head 116 into the reproducing position the motor 217 is reversed, causing the head 116 to be moved from the recording position, through the neutral position to the reproducing position (Figure 7).

It should be noted that the motors 217 and 218 are normally operated in one direction only long enough to move the heads 116 and 117 to the desired position and thus the worm gears 222 never make a complete revolution. This is accomplished in a manner to be described later by suitable electric control equipment operating in conjunction with head position switches 234 and 235 (Figs. 5 and 8) which are operated by the shafts 223. As shown in Figs. 19 and 20, the head position switches 234 and 235 include housings 238 attached to the carriage 115. The housings 238 enclose insulating bases 239 on which switch segments 240 are mounted. The switch segments 240 are contacted by movable contacts 244 carried by insulating arms 245 attached to the shafts 223, the movable contacts 244 being normally moved into engagement with the switch segments 240 by springs 246.

It should be noted that there are three of the switch segments 240 associated with each of the head position switches 234 and 235. These switch segments 240 are so positioned on the insulating bases 239 that they are contacted by the moving contacts 244 when the heads 116 and 117 are in the three positions to which they may be moved, namely the recording or dictating position, the neutral position, and the reproducing or play-back position. We have accordingly designated the individual switch segments 240 with the designations 240D, 240N and 240P, indicating that that particular switch segment is in contact with the movable contacts 244 when the head associated therewith is conditioned for dictation, neutral or play-back respectively. The particular method in which the switch segments 240 are connected in the control system for controlling the action of the motors 217 and 218 will be more clearly explained in connection with the wiring diagram (Figs. 25 to 28).

As the worm gears 222 may rotate sufficiently to move the pins 226 out of engagement with the slots 227 after the head carriages 198 and 199 have been lowered to the proper position, means is provided as shown in Figs. 6 and 7 for locating the forward end of the head carriages 198 and 199 so that they are held in alignment. This means includes centering pins 250 which are secured in holes 251 in the forward end of the head carriages 198 and 199 in such a manner that tapered ends on the pins 250 will be received into conical seats 254 formed in projections 255 of the carriage 115 when the recording heads 116 and 117 are in the reproducing position as shown in Figure 7. The length of the pins 258 is adjustable by set screws 256 threaded in the head carriages 198 and 199 so that the head carriages 198 and 199 are adjustable to the proper vertical height above the records 102 and 103.

In the recording position, the centering device as shown in Fig. 6 comprises centering pins 258 which are slidable in holes 259 in the head carriages 198 and 199 and are received in the conical seats 254 when the heads 116 and 117 are in the recording position. Pinned to the pins 258 are upper and lower washers 260 and 261 which hold the pins 258 in the holes 259, the lower washers 261 forming upward stops for the pins 258 and being adjusted to hold the head carriages 198 and 199 at the proper height above the records 102 and 103.

The centering pins 258 also cooperate with the head supporting structure to secure proper operation of the heads 116 and 117 while recording. It is well known that the heads 116 and 117 must be permitted a certain lateral movement during reproduction, this being accomplished by the loose fit between the sleeves 202 and the openings 203 in the manner already set forth. It is also well known that during recording, lateral movement of the heads 116 and 117 must be prevented in order to cut an accurate helix on records 102 and 103. The latter feature is accomplished in a novel manner in conjunction with the centering pins 258 by arms 264 which are pivoted by pivot pins 265 to projections 266 inside the head carriages 198 and 199. The forward ends of the arms 264 are forked to go around the centering pins 258 above the washers 260 and are maintained in contact with the washers 260 by springs 268 which normally force the pins 258 and the forward end of the arms 264 downward, but which are compressed by the weight of the head carriages 198 and 199 as the heads 116 and 117 are moved to the recording position and the pins 258 are received in the seats 254. Attached to the other end of the arms 264 are centering pins 270 which are tapered to fit closely in openings 271 and 272 in the transverse web section 204 and in the sleeves 202 respectively. This prevents lateral movement of the heads 116 and 117. It should be noted that the pins 270 are moved into the openings 271 and 272 only when the centering pins 258 are in the seats 254 with the heads 116 and 117 in the recording position, thus preventing lateral movement of the heads 116 and 117 only while recording.

It will be seen from the above description that our method of moving the head carriages 198 and 199 from one position to the other lifts the heads 116 and 117 substantially vertically, moves them forward and again lowers the heads 116 and 117 substantially vertically. In the present dictating machines the same movement is secured by sliding members which engage cams to raise the heads into the neutral position. With such an arrangement, the recording stylus may be slid along the record for a distance before it is raised therefrom causing the recording stylus to dig a hole in the record. With a machine of our design we prefer to make the parts so that the pins 226 on the worm gear 222 engage the slots 227 in the head carriages 198 and 199 when the pins 226 are approximately in a horizontal line with the shafts 223 of the worm gears 222. This causes a practically vertical movement of the head carriages 198 and 199, which raises the recording styli from the records 102 and 103 before the translation movement of the head carriages 198 and 199 is started.

Another important consideration in the movement of the recording heads 116 and 117 is that these heads move sufficiently slowly that they do not strike the records 102 and 103 a damaging blow when they are lowered thereagainst. The speed of the head driving motors 217 and 218 is made slow enough so that the heads 116 and 117 are lowered carefully onto the records 102 and 103. We have found that a speed of approximately 8 R. P. M. for the speed of rotation of the worm gears 222 is correct for lowering the heads 116 and 117 on the records 102 and 103 with the proper speed. This speed is obviously dependent on other factors such as the weights of the heads and so forth.

It will also be noted that the type of centering devices which we have provided for use in the head carriages 198 and 199 permits the head carriages 198 and 199 to be supported in the carriage 115 sufficiently freely so that the head carriages 198 and 199 may be moved between their various positions without requiring extra power to overcome friction, but at the same time the head carriages 198 and 199 are carefully located whenever they are in the recording or reproducing position.

Position registering mechanism

We have found that to successfully operate a remotely controlled dictating machine, it is desirable for the operator to know at all times the exact position of the carriage with respect to the record. It is desirable for the operator to have some means of knowing how much of the record has been recorded. It is necessary for the operator to have some means of returning the carriage to a place on the record in advance of the point at which dictation was stopped after he had played back certain of the recorded dictation. It is desirable in the latter case to return the carriage to a point as near that point at which recording was stopped as is possible to avoid unnecessary wasting of the record.

We have in the present invention, provided devices for automatically accomplishing the above results and have termed them a position indicating device 275 and a position registering device point defining means 276. In the preferred form, these two devices together with certain limit switches and certain change-over devices for changing the recording from one record to another are enclosed in a removable cylindrical housing 280 as shown in Figs. 5 and 9. The housing 280 is attached to the base 87 as by a screw 281 which is threaded into an arm 282 formed on the base 87. The housing 280 is located in place by a round plate 284 which is secured to the post 130 by screws 285 and which fits inside the housing 280.

The mechanism inside the housing 280 is driven by the advancing screw 128 through a gear train 288, Figs. 9 and 12. The gear train 288 includes a worm 289 formed on the end of the advancing screw 128, which meshes with a worm gear 290 attached to a shaft 291. The shaft 291 is journaled by bearings 292 suitably secured to the post 130. The gear train also includes a worm 294 which is formed on the shaft 291 and which meshes with a worm gear 295 attached to a shaft 296 (Fig. 9). The shaft 296 is journaled by a bushing 297 suitably secured in the post 130 and also by a bushing 298 which is attached to the plate 284 as by screws 300.

The shaft 296 is the main drive shaft for the equipment inside the housing 280, this equipment being operated by an arm 304 which is secured to the shaft 296 as by a set screw 305. It is intended that the arm 304 should make only part of a revolution as the carriage 115 is moved the length of the records 102 and 103. In the preferred form of our invention we have therefore made the ratio of the gear train 288 four hundred eighty to one as this ratio will give approximately 270 degrees of rotation of the arm 304 as the advancing screw 128 rotates to move the carriage 115 from one end of the records to the other. It is obvious that other ratios will give satisfactory results.

It will be noted that the position of the arm 304 relative to the plate 284 is a function of the position of the carriage 115 relative to the records 102 and 103, as the advancing screw 128 is always in mesh with the nut 129 in the carriage 115 and the arm 304 is geared to the advancing screw 128. We therefore make use of the rotation of the arm 304 in operating the position indicating and position registering devices.

The construction of the arm 304 and the other equipment in the housing 280 may be plainly seen by referring to the exploded view as shown in Fig. 18.

The position indicating device 275 is of the electric type and includes the position indicating voltmeter 53 in the control pad 32 and a resistance strip 308 which is retained in a groove 309, Figure 9, formed in a semi-circular insulating block 310 suitably secured to the plate 284. Electrical contact with the resistance strip 308 is made by a contact shoe 312 (Figure 13) which is carried by an insulating block 313 attached to the arm 304.

It will be noted that if an electrical potential is applied across the resistance strip 308 and the voltmeter 53 is connected between the contact shoe 312 and the proper terminal of the resistance strip 308 in a manner well known in the electrical art, the resistance 308 will act as a potentiometer and the voltmeter 53 will indicate accurately to the operator the exact position of the carriage 115 and the heads 116 and 117 relative to the records 102 and 103. The exact electrical connections for securing the above results together with the method of changing connections to alternately indicate for either of the records 102 or 103, will be more fully described later in connection with the wiring diagram (Figs. 25 to 28).

The position registering device 276 is also electrical in its operation, but includes certain mechanical equipment which operates in conjunction with the arm 304. The mechanical equipment includes certain members which are moved ahead as the arm 304 rotates during recording, but which are left in their last position corresponding to the point of farthest advance of the recording head as the arm 304 moves back as when the operator moves the carriage back over the record in order to play back certain of the recorded dictation (Figs. 15 and 16). When the arm 304 again moves to the position it occupied when recording was stopped and recording is again started, the members are again moved forward in proportion to the amount of recording accomplished.

In the preferred form of the invention these members are rotatable position arms 318 and 319 which are mounted for rotation on a shaft 320. The shaft 320 is mounted coaxially with the arm 304 by a supporting block 321 attached to the arm 282 as by screws 322 and is secured in place as by a set screw 323 threaded in the supporting block 321. The position arms 318 and 319 are retained on the shaft 320 by a flanged end of the shaft 320 and are separated by a washer 326 which is nonrotatably keyed to the shaft 320. The position arms 318 and 319 are held against the washer 326 and the flanged end of the shaft 320 by a spring 327 which engages the supporting block 321 and a washer 328 also keyed to the shaft 320 and engaging the position arm 318. The above method of mounting the position arms 318 and 319 permits rotation thereof against a certain frictional resistance produced between the arms 318 and 319, the washers 326 and 328, and the flanged end of the shaft 320. This frictional resistance is made sufficiently great so that the position arms 318 and 319 will stay in any position in which they are left and will not move under their own weight.

The position arms 318 and 319 are further constructed so that insulating portions 330 thereof lie parallel to the ends of an insulating block 332 which is attached to the end of the arm 304 as by screws 333. The insulating portions 330 of the position arms 318 and 319 carry contacts 336 and 337 which are positioned so as to engage contacts 338 and 339 attached to opposite ends of the insulating block 332 when the arm 304 is rotated. It will be noted that as the arm 304 is rotated in a counter-clockwise direction (Fig. 10), contacts 336 and 338 will engage and the position arm 318 will be moved forward with the arm 304. When, however, the arm 304 is moved backward, the position arm 318 will be left in the advanced position as illustrated in Fig. 16. Conversely a clockwise rotation of the arm 304 will move the position arm 319 forward and a counter-clockwise movement will leave the position arm 319 in the farthest advanced position.

The above action may be more clearly seen by referring to Figs. 15, 16, and 17 which show only the position registering equipment associated with record 102. Figure 15 illustrates the position of the equipment when in the position for recording and with approximately half of record 102 recorded. Note that in this position the position arm 318 is being pushed ahead by the arm 304. If the operator now wishes to play back certain of the recorded dictation, the carriage 115 is retracted or moved in the "Y" direction in which it may occupy a position as shown in Fig. 16. It will be noted that the position arm 318 has remained in the last position which it occupied when dictation stopped. It will be shown later that when the carriage 115 is again advanced to a position as shown in Figure 15, the engagement of contacts 336 and 338 sets up a condition whereby the head 116 is caused to move to the dictating position. The recording may then be continued until the end of the record 102 is reached in which position the equipment is in approximately the position shown in Fig. 17.

The position arms 318 and 319 are on opposite sides of the arm 304 so that when the record 102 is being recorded and the arm 304 is being rotated in the counter-clockwise direction the position arm 318 will be advanced. Also when the record 103 is being recorded, the arm 304 will rotate in the clockwise direction and the position arm 319 will be advanced. If the position arms 318 or 319 are to register the point at which recording was stopped on the records 102 or 103, it is essential that they be moved forward only at such time as the records 102 or 103 are being recorded. This feature is accomplished electrically by certain relays operating in conjunction with the contacts 336, 337, 338 and 339, in a manner to be described later in connection with the wiring diagram Figs. 25 to 28.

Since only one of the records 102 or 103 is recorded at a time, we provide a device for engaging the position arm associated with the inactive record and causing that arm to move with the arm 304. This device is attached at the end of the arm 304 and includes, a pair of insulating frames 346 (Figs. 9 and 10, 11 and 18) which are held in spaced relationship by spacer blocks 347. The insulating frames 346 are secured to the spacer blocks 347 as by screws 348 and one of the insulating frames 346 is attached to the block 332 as by screws 349 so that the insulating frames 346 are in a plane at right angles to the axis of the arm 304.

As shown in Fig. 11, the insulating frames 346 support a toggle mechanism 350 which includes a toggle link 354 and a tripping lever 355. The toggle link 354 is formed by two insulation members 356 which are spaced apart by a bar 357 (Figs. 9 and 11). The insulation members 356 are pivoted to the insulating frames 346 by pins 358, so that the toggle link 354 is free to pivot back and forth between the frames 346, the spacer blocks 347 acting as stops therefor. The tripping lever 355 is likewise pivoted between the frames 346 by a pin 359 and is maintained centrally therebetween by sleeves 360 on the pin 359. At one end of the tripping lever 355 is a hole in which a tension spring 362 is hooked, the other end of the spring 362 being hooked around the bar 357.

The above equipment forms the toggle mechanism 350 which is operated in the same manner as any conventional toggle. Referring to Figure 11, it will be seen that if the tripping lever 355 is rotated in the counter-clockwise direction, the spring 362 will be stretched and will pull against the bar 357. As the tripping lever 355 is rotated farther, the direction of the pull on the bar 357 moves to the left of the axis of the pins 358 and the toggle link 354 quickly trips from its right hand position as shown in Figure 11 to a left hand position in which it rests against the left hand spacer block 347. If now the tripping lever 355 is rotated in the clockwise direction the toggle link 354 will trip from its left hand position to its right hand position in a manner peculiar to toggle devices and well known in the art.

At the free end of the toggle link 354 is a holding hook 364 which provides a flat central portion which is attached to the toggle link 354 and two portions which are adapted to fit around the insulating portions 330 of the position arms 318 and 319 (Fig. 11), and hold one or the other of the arms 318 or 319, so that it moves with the arm 304. This may be plainly seen by referring to Fig. 10 in which the arm 319 is shown as being held by the hook 364 while the other arm 318 is free to move independently of the arm 304. If the toggle mechanism 350 is tripped to the left hand position the hook 364 will then be in a position to hold the other arm 318.

The means by which the toggle mechanism 350 is tripped consists of stops 366 and 367 which are secured to the plate 284 as by screws 368. The stops 366 and 367 are positioned near the end of travel of the arm 304, which position also corresponds to the end of travel of the carriage 115 along the records 102 and 103, and are placed in circular alignment with the tripping lever 355 so that the tripping lever 355 will strike the stops 366 and 367 and trip the toggle mechanism 350 at the end of travel of the arm 304. This is clearly shown in Fig. 11 which is taken with the carriage 115 near the end of record 102 as shown in Fig. 17 and with the arm 304 rotated nearly to the end of its travel in a counter-clockwise direction and shows the stop 366 in a position to engage the tripping lever 355 and trip the toggle mechanism 350.

In conjunction with the toggle mechanism 350 we have provided certain devices whereby the tripping of the toggle mechanism 350 at the end of travel of the arm 304 causes the recording to be changed from one record to the other. These devices are electrical in their operation and include certain relays which are more clearly explained later in conjunction with the wiring diagram (Figs. 25 to 28) and which operate with electric contacts which are operated by the toggle mechanism 350.

The contacts are formed by a conducting bar 370 (Figs. 9, 10, 11) supported by the insulation members 356 of the toggle link 354, and contacts 371, 372, 373 and 374 attached to the insulating frames 346 in a position to be engaged by the bar 370 when the toggle mechanism 350 is in its left hand and right hand positions. It will be noted that a circuit is formed between the contacts 371 and 372 by the bar 370 when the toggle mechanism 350 is in its left hand position and another circuit is formed between the contacts 373 and 374 when the toggle mechanism is in its right hand position. These two circuits are made use of in the electrical connection of the equipment to change over the recording from one record to the other in a manner to be described later.

In addition to the position registering and position indicating devices which are located inside the housing 280, we have also provided therein limit switches 380 and 381 (Figs. 9 and 10) for limiting the travel of the carriage 115 in the "X" and "Y" directions respectively. The limit switches 380 and 381 include movable fingers 382 which are insulated from the arm 282 by insulating blocks 383 attached to the arm 282 as by screws 384. The movable fingers are located in the housing 280 so that they will be contacted by the insulating blocks 332 attached to the arm 304 as the arm 304 reaches the end of its travel, which also corresponds to the end of travel of the carriage 115 along the records 102 and 103.

Suitably secured to the free ends of the movable fingers 382 are contacts 388 which are normally contacted by contacts 389 suitably secured to the end of stationary fingers 390. The stationary fingers 390 are held by insulating blocks 391 which are attached to the plate 284 as by screws 392. The movable fingers 382 normally spring against the stationary fingers 390 so as to make an electrical circuit between the contacts 388 and 389. The stationary fingers 390 are positioned so that the movable fingers 382 are contacted by the insulating blocks 332 and the circuits between the contacts broken just after the toggle mechanism 350 has tripped to change the recording from one record to the other. The contacts 388 and 389 are connected in the control circuit to the driving motor 150 so that the motor 150 is prevented from moving the carriage 115 beyond the ends of the records 102 and 103.

We have also provided inside the housing 280, certain contacts which operate in conjunction with the end of record buzzer 61 in the control pad 32 to indicate when the record 102 or 103 is nearly full of recorded dictation. The contacts include segments 395 and 396 embedded in the resistance insulating block 310 and are located near the ends of the resistance strip 308. As shown in Fig. 14, the segment 395 or 396 is contacted by a contact shoe 397 carried by the insulating block 313 on the arm 304 so that contact is formed therebetween. The segment 395 or 396 and the contact shoe 397 are connected in a circuit with the end of record buzzer 61 in a manner to be described later so that the buzzer 61 indicates to the operator the end of the available recording space on the record 102 or 103. The width of the segments 395 and 396 is made small so that contact between the shoe 397 and the segment 395 or 396 is of short duration and the consequent operation of the buzzer is of short duration.

We have also provided certain other equipment which functions with the machine 88 in order to indicate to the transcribing operator when an error is made in the dictation and to indicate to the transcriber the length of the dictated material, as is commonly done when using dictating machines. This equipment includes card holders 399 and 400 (Figs. 5, 9, and 22) supported from the base 87 by the posts 124 and 125 so that one of the card holders 399 is above the head carriage 198 and the other card holder 400 is above the head carriage 199. The card holders 399 and 400 are provided with funnel shaped guides for guiding cards 401 which may be inserted in the holders 399 and 400. The card holders 399 and 400 are so arranged that the cards 401 are inserted in the holders from the same end of the mandrel as the record with which they are associated. Flanges formed on the underside of holders 399 and 400 retain the cards 401 in place but leave the lower faces thereof exposed. Extending below the cards 401 are inked ribbons 402 which are attached to posts 124 and 125.

The stamping devices which cooperate with the card holders 399 and 400 include solenoids which are designated as error solenoids 404 and 405 and length of letter solenoids 406 and 407 as shown in Figs. 5 and 6. The solenoids are mounted beneath the card holders 399 and 400 in axial alignment with the transverse axis of the carriage 115, the error solenoid 404 and the length of letter solenoid 406 being associated with the card holder 399 and error solenoid 405 and length of letter solenoid 407 being associated with the card holder 400. The center portions of the solenoids are hollow and slidably guide armatures 408 which move upward when the solenoids are energized. The upward movement of the armatures 408 causes the upper end thereof to strike the inked ribbons 402 and print on the cards 401. In order to identify the marking, a letter E, for error, may be formed on the end of the armatures of the error solenoids 404 and 405 and a letter L, for length, may be formed on the length of letter solenoids 406 and 407.

As best shown in Fig. 6 we provide below the records 102 and 103, troughs 409 which are open at the lower edges thereof and connected to the inlet tube 80 of the vacuum fan 78 shown in Fig. 4. The troughs 409 are positioned close to the records 102 and 103 so that the air which is withdrawn by the fan 78 through the tube 80 produces a rapid movement of air adjacent the records 102 and 103. This causes any particles of wax which are cut from the records 102 and 103 by the recording styli 193 during recording to be sucked into the troughs 409 and carried down the tube 80 into the porous bag 82. Some method of disposal of the wax chips which are cut from the records is important in the operation of a remotely controlled dictating machine as this machine is usually not under the observation of the operator and if sufficient wax collects it may interfere with the proper operation of the machine. Other methods of wax removal may be used, however, in place of the type which we have illustrated.

We have found that a feature which is psychologically important in a remotely controlled dictating machine is to have an indicating means for indicating when the records 102 and 103 are rotating for recording and reproducing. Accordingly as shown in Figures 9 and 21 the advancing screw 128 operates an intermittent means comprising a switch 410 which operates in conjunction with the control equipment to indicate to the operator when the records are rotating. This switch 410 includes spring switch fingers 411 insulated from the base by insulating blocks 413 and attached thereto by screws 414. The fingers 411 carry contacts 416 which are normally maintained in disengagement by spring action of the fingers 411. Secured to the end of the advancing screw 128 is a single lobe cam 417 of insulating material which contacts one of the fingers 411 and closes the contacts 416 during rotation of the advancing screw 128. Thus a rotation of the advancing screw causes an intermittent closing of the circuit through the contacts 416. The fingers 411 are connected in the circuit with the indicating lights 56 and 57 in the control pad 32 so that these lights 56 and 57 are blinked as the records 102 and 103 rotate. These connections as well as the electrical connections for the other equipment are fully shown in the wiring diagram for the equipment which is illustrated in Figures 25 to 28 inclusive.

*Wiring diagram*

The wiring diagram illustrates the complete wiring for the equipment described heretofore and in addition the wiring for certain relays which are mounted on the relay rack 77 and which are electrically interlocked to secure the proper operation of the dictating machine 30. It is not essential that the equipment and relays be wired exactly as shown hereinafter, it being understood that other circuits and arrangements of circuits may also accomplish the desired results in a satisfactory manner. Electrical relays are used not only for actuating certain equipment but for locking that equipment against operation by interrupting certain circuits controlling the operation of that equipment. We therefore prefer to use electrical relays which we interlock with each other electrically instead of using mechanical linkages, latches, and movements which are dependent on each other for the proper operation, but our invention comprehends the uses of such mechanical linkages and movements and we are not limited to the use of relays for accomplishing the desired results. It is obvious that various types of relays may be used, but we have reduced as nearly as possible the types of relays which we use to two common types; namely, the magnetically closing and spring or gravity opening type 420, illustrated diagrammatically in Figure 24 and the impulse type 421 illustrated diagrammatically in Figure 23. In the impulse type 421, two solenoids 422 are used and the armature 423 operates a toggle 424 which maintains the contacts 425 in the last operated position. An auxiliary finger 426 on the relay de-energizes the operating coils of the relay when the toggle 424 has been tripped. As the interlocking of the relay circuits to secure the proper operation of the equipment is somewhat complex, a brief preliminary description of the wiring and operation of the machine 30 will aid in tracing the circuits.

It has been previously shown that the preferred form of our invention is essentially dual in character in that there are dual record and head drives and dual position registering devices, but that there is only one set of controlling and indicating devices. This system is continued in the relay and control circuits in that each record drive and each head drive have individual relays for controlling their operation, these relays being alternately connected to the control and indicating devices by suitable changeover relays, for alternately recording on the records 102 and 103. The relays secure this operation by providing control so that while one of the heads 116 or 117 is recording, the other head is maintained in the neutral or in-operative position.

The major operations of the machine 30 are performed by the control button 52, the foot switch 34 and a sound recording system designated by the numeral 450 in Figure 25. The function of these devices can best be understood by an explanation of the sequence of operation of the machine 30. Let us assume that the operator has just finished recording some dictation on record 102, for example, and that the machine 30 is in the position shown in Figures 5 and 6 with the head 116 in the recording position and head 117 in the neutral position. If the operator wishes to play back certain of the recorded dictation, he presses the control button 52 in the control pad 32 and holds it down. Certain relays are then actuated which automatically cause the head 116 to move to neutral and stop, and then cause the carriage 115 to move in the "Y" direction along the record 102 at high speed. It should be remembered that the "Y" direction is the direction in which the head 116 is moved relative to the record 102 in order to move over the previously dictated portion of the record 102 and that the "X" direction is the direction that the head 116 moves relative to the record 102 when recording thereon.

When the operator reaches the portion of the record 102 which he wishes to play back as indicated to him by the position indicating device 53, he releases the control button 52. The carriage 115 is immediately stopped by certain relays and the head 116 is then automatically moved to the playback position. To play back the recorded dictation, the operator then depresses the foot switch 34. Certain relays then operate the clutches 158 and 134 and energize the motor 150 so as to cause the record 102 to rotate as indicated by arrow 118 (Figure 6) and the carriage 115 to advance in the "X" direction for playback. The recorded material is then translated by the head 116 into electrical undulations which are amplified by the amplifier 74 and reproduced as sound undulations by the dynamic speaker 45, the above devices forming part of the sound system 450.

When the operator has finished playing back the desired dictation, he depresses the control button 52 a second time and releases it. The head 116 is automatically returned to the neutral position, moved in the "X" direction at high speed to the exact place where dictation was previously stopped. This is secured by relays operating in conjunction with the contacts 336 and 338 on the position registering device 276. The head 116 is then automatically moved into dictating position. To dictate, the operator then depresses the foot switch 34. The record 102 is then caused to rotate and the carriage to advance for dictation. The sound system 450 then records on the record 102 the dictation of the operator.

Should the operator desire to play back certain other dictation between the portion just played back and the point where recording was stopped, he watches the position indicating device 53 while the carriage 115 is moving in the "X" direction along the record 102. When the carriage 115 is at the desired point on the record 102 he depresses the control button 52 again, and releases it. Movement of the carriage 115 in the "X" direction is then automatically stopped and the head 116 is automatically moved to playback position. A subsequent push on the control button causes the head 116 to move to neutral and the carriage 115 to move in the "X" direction in the manner already described. It will thus be seen that the operator may drop the head 116 to play back at any time and as often as he wishes before he reaches the place where dictation was stopped, this being the place registered by the position registering device 276.

When the operator has dictated to the end of record 102, the toggle mechanism 350 is tripped as previously explained, and suitable relays change over the equipment to record on the other record 103. If the operator has finished dictating for some time, the record on which recording was last accomplished, for example record 102, may be removed from the machine by pressing a record change push button 451 retained in an opening in the arm 282 as shown in Figure 9. This causes the head 116 to be automatically moved to neutral and to move in the "X" direction at high speed until the toggle mechanism 350 is tripped whereupon control is automatically changed over to the other record 103 and the record 102 may then be removed.

Reference will now be made to the wiring diagram as shown in Figures 25 to 28 inclusive, where the above operations are more fully explained. Referring generally to the diagram it will be noted that vertical busses are positioned on opposite sides of the drawings. These busses extend from one figure to the next and the operating coils and equipment are placed between the busses. In general, the busses at the left side of the page have one polarity and those at the right side, the opposite polarity. It should be understood that in referring to polarity we do not wish to be limited to any particular source of power for operating the equipment as either direct current or alternating current may be used to operate our invention.

It should also be noted that we have designated one of the right hand busses as the main bus 452 and the two adjacent busses 453 and 454 as No. 1 head bus and No. 2 head bus. These latter busses 453 and 454 are connected to individual relays controlling the head drives for heads 116 and 117 respectively, these heads also being referred to as head No. 1 and head No. 2 as previously explained. The busses 453 and 454 are alternately connected to the main bus 452 for recording alternately with head No. 1 and head No. 2. We also designate another bus 455 at the left of the drawings as the other main bus.

To simplify the location of circuits, we have numbered the circuits consecutively. In accordance with conventional electrical practice a circuit is formed by a chain of devices connected in series between busses of opposite polarity. In some instances certain of the devices are connected in a plurality of circuits. It is obvious, however, that the devices may be further combined into circuits or more devices may be used to simplify the circuits without departing from the spirit of the invention. We have further shown the mechanical equipment in the same position as on previous drawings. All relays are shown de-energized. In designating the various relays we have lettered them corresponding to their functions and where the number 1 or 2 precedes the letters, this designates that that particular relay functions only with No. 1 head drive or No. 2 head drive respectively. The contacts belonging to a particular relay are lettered the same as the relay for clarity, but are not necessarily shown in the wiring diagram adjacent the relay coil.

In order to connect the equipment for operation, the main bus 455 and a bus 460 are connected to opposite polarities of a suitable source of electric power. As stated above, the bus 455 forms one of the main busses of the equipment and the bus 452 forms the other main bus. The bus 460 is connected to energize the bus 452 through the contacts of a time delay relay TDR. This relay TDR is of a common type in which the contacts thereof are instantly closed when the coil thereof is energized, but the contacts thereof are delayed in their opening by suitable time delay means 461 which may be a dashpot, clock mechanism or other suitable means. The coil of the TDR relay is connected in a series circuit 462 with a contact of the foot switch 34 between the busses 455 and 460, so that when the foot switch 34 is depressed by the operator the relay TDR is energized. The contacts of the TDR relay are then immediately closed and the bus 452 energized. As will be shown later, the energization of bus 452 places the equipment in operating position.

It will thus be seen that when the operator depresses the foot switch 34 for the first time, the relay TDR is closed and the equipment is energized for operation. When the operator releases the foot switch 34, however, the bus 452 and the machine 30 are maintained in an operative position for a given length of time depending on the setting of the TDR relay. It has been previously stated that the foot switch 34 is also used to control the rotation of the records during dictation and playback. The time delay relay TDR therefore permits the foot switch 34 to be released by the operator between periods of dictation and playback while maintaining the machine energized for operation. However, should the operator while operating the machine be interrupted to answer a telephone call or attend to other business, the machine 30 is deenergized after a given length of time, thus saving power and conserving the useful life of the vacuum tubes and other equipment in the machine 30. We have found that a time delay of approximately five minutes is desirable, but obviously other periods of delay will give satisfactory results.

It should be noted that delayed opening of the relay TDR is essential to the proper operation of those dictating machines where the machine is disconnected when the operator releases the foot switch, as the alternate connecting and disconnecting of the equipment during dictation would give unsatisfactory results. Many operators of dictating machines dictate jerkily; that is, dictate a few words, stop, dictate a few more words and again stop, etc. During the time they are not dictating, they stop the revolving of the record, and start it when they again dictate a few words, thus causing the record to revolve and stop many times in a minute. It is obvious that if the machine 30 is energized only at such times as the foot switch 34 is depressed, the motor 150 would also stop and start many times in a minute and would not reach a uniform speed at the beginning of the dictation. Consequently the recording would be distorted due to the variation in speed of the recording medium during the short periods of dictation.

It is also obvious that if a time delay relay were not provided, it would be necessary for the operator to keep the foot switch 34 depressed during such time as the heads are shifted from one position to the other or moved with respect to the length of the record.

We are not limited in the use of this automatic cut-off feature to a machine of the type illustrated, nor to any remotely controlled dictating machine, as it is obvious that this novel device finds utility in combination with any type of dictating machine.

When the bus 452 is energized, certain equipment which is connected in circuits between the main busses 452 and 455 is energized. This equipment includes the amplifier 74 of the sound system 450 which is connected between the busses 452 and 455 by a circuit 463. The sound system 450 is preferably a sound system as outlined in co-pending application Serial No. 828d previously referred to, and includes a sound responsive and sound reproducing device or dynamic speaker 45 which may receive the power for energizing its field from the amplifier 74. The voice coil of the dynamic speaker 45 is connected in a conventional manner through the "T" pad 50 and connected by the cable 36 to a switching mechanism 465. The switching mechanism is also connected by circuits 466 and 467 to the input and output terminals of the amplifier 74 and by circuits 468 and 469 to the heads 116 and 117 which are also referred to as No. 1 head and No. 2 head.

The switching mechanism 465 may be of the type previously described in the co-pending application, Serial No. 828d or any other suitable switching mechanism. The switching mechanism 465 may comprise a relay (not shown) which in one position connects the system for recording by connecting the dynamic speaker 45 to the input of the amplifier 74 and the output of the amplifier 74 to one of the heads 116 or 117. In the other position the switching device 465 connects the system for reproducing by connecting one of the heads 116 or 117 to the input of the amplifier 74 and the dynamic speaker 45 to the output of the amplifier 74. In the system shown we have arranged the circuits so that in the deenergized position, the switching mechanism 465 connects the system for recording and in the energized position for reproducing. The coil of the relay in the switching device 465 is connected in circuits 470 and 471 extending between the busses 452 and 455 and automatically switches the sound system 450 in a manner to be described hereinafter.

We have found that the sound system 450 which we have illustrated is particularly adapted for use with a dictating machine of our invention, but it should be understood that we are not limited to this form of a sound system. In case a machine of our invention is positioned adjacent the operator the conventional type of mechanical sound recording and reproducing devices may be used. We have included such sound systems in our definition of a translation means which is operable between the recording medium and a propagating medium to transmit undulations in at least one direction corresponding to the sound undulations therebetween. In the form shown, the translation means acts to transmit electrical undulations in both directions for recording and reproducing, but our invention comprehends the use of a translation means whether such means is used for recording or reproducing or for both or whether the intermediary of electrical undulations is employed or not. Further, in conjunction with the TDR relay which we have shown, we prefer to construct the amplifier 74 so that the vacuum tubes used therewith are of the instantaneously heating type so that as soon as the bus 452 is energized by the depressing of the foot switch 34, the amplifier is immediately ready for operation. We realize, however, that heater types of vacuum tubes may also be used in the amplifier 74 with satisfactory results providing a certain time delay is allowed after the foot switch 34 has been depressed for the first time to permit the tubes to heat up.

When the bus 452 is energized, the operator is notified immediately that the equipment is in operative condition by the illumination of the dial of the position indicating device 53, this being secured by energization of the dial light 55 which is connected between the busses 452 and 455 by a circuit 472. Indication is thus given the operator that the equipment is ready for operation. We are not limited to the use of a light for this indication, as other means may also be used. In fact, it is not essential, but desirable that such indication be given the operator.

As stated above, we prefer to relay all mechanically operated contacts, thus securing many advantages. Among the advantages secured are the elimination of a plurality of electrical contacts on the mechanical equipment and the elimination of a large number of wires which may interfere with the proper operation of the mechanical equipment. The relaying also helps segregate and facilitates the location of troubles which arise from the wearing out of parts due to continued operation. We therefore prefer to relay the contacts of the position registering mechanism 276. The connections for relaying this mechanism are secured by circuits 475, 476, 477 and 478. It will be noted that the circuit formed between the contacts 373 and 374 of the toggle mechanism 350 by the bar 370 is included in a circuit 477 which extends between the main bus 452 and the main bus 455 and includes one coil YLR of an impulse limit relay LR. This relay LR is designated as the limit relay since it operates in conjunction with the toggle mechanism 350 which trips at the limits of travel of the carriage 115. The coils of the limit relay LR are respectively designated as the XLR and YLR coils since they are energized when the carriage 115 reaches its limit of travel in the "X" and "Y" directions respectively. The contacts of the relay LR are likewise designated as XLR contacts and YLR contacts to indicate that the XLR contacts are closed after the XLR coil has been energized and vice versa. In a similar manner the contacts 371 and 372 are connected in series with the XLR coil by circuit 476.

It will be noted that the limit relay LR maintains its contacts in the same position as the contacts of the toggle mechanism 350. As the toggle mechanism 350 is tripped from one position to the other, the circuit through the contacts thereof are maintained until the toggle mechanism 350 has been tripped to its other position. This operation is repeated in the limit relay LR in that when the bar 370 closes the circuit between the contacts 371 and 372, the circuit is completed through circuit 476 and the XLR coil which causes the XLR contacts of the limit relay LR to be closed until the toggle mechanism has been tripped to close the contacts 373 and 374, at which time the YLR contacts of the limit relay LR are closed.

We have also relayed the contacts 336, 337, 338 and 339 of the position registering device by connecting contacts 374 to contact 338 and contact 336 in a circuit 475 including the coil of a position registering relay 1 PR for No. 1 head. When the contacts 336 and 338 are engaged, a circuit is then formed extending from bus 452 to contacts 373, 374, 338, 336 and the coil of relay 1PR to the bus 455. Similarly we have connected contact 372 to contact 339 and have connected contact 337 in a circuit 478 with the coil of a position registering relay 2PR for No. 2 head.

We have likewise relayed contacts 240 of the head position switch 234. The moving contact 244 is connected to No. 1 head bus 453 and the dictate segment 240D is connected in a circuit 480 with the coil of a relay 1D which is the dictating relay for No. 1 head. It will thus be seen that relay 1D is energized whenever No. 1 head is moved to dictating position, a circuit then being completed between moving contact 244 and the segment 240D which energizes the relay 1D. We have also connected switch segment 240P in a circuit 481 with the coil of a playback relay 1P for No. 1 head so that the relay 1P is energized whenever the No. 1 head is in the playback position.

For reasons which will appear later, it is necessary to establish control circuits when the heads are in the neutral position, which are dependent on whether the heads are moved from the dictate or playback position in their last movement. We therefore provide an auxiliary impulse relay 1X which has coils thereof connected in parallel with the coils of relays 1D and 1P, a coil 1DX of relay 1X being connected by a circuit 482 in parallel with the coil of relay 1D and a coil 1PX of relay 1X being connected by a circuit 483 in parallel with the coil of relay 1P. The position of the contacts in auxiliary relay 1X thus indicates the last position which was occupied by No. 1 head, the 1DX contacts closing when the head was last in the dictating position and the 1PX contacts closing when it was last in the playback position.

We also connect the neutral segment 240N in a circuit 484 with the coil on a neutral relay 1N so that the relay 1N is energized whenever the No. 1 head is in the neutral position. We also connect the contacts of relay IX in circuits 485 and 486 with relays INP and IND so that when No. I head is moved to the neutral position relay IND will be energized if the head has been moved to neutral from the dictate position and relay INP will be energized if the head has been moved to neutral from playback. It will thus be noted that we have provided complete relays for the segments 240 of the head position switch 234 and by connecting the movable contact 244 to the No. I head bus, we have insured that the relays connected with the head position switch 234 will be energized only at such time as the No. I head bus is energized.

The contacts of the control button 52 are likewise relayed by a master relay MR. The circuits for energizing the master relay includes circuits 490 and 491 which extend from the No. I head bus through a contact of the relay YLR and from the No. 2 head bus through a contact of the relay XLR respectively. The circuits 490 and 491 then extend through the contacts of the control button, 52, through contacts of relays IRC and 2RC and the coil of the master relay MR. Relays IRC and 2RC are record changing relays whose functions will appear later, and whose contacts in circuits 490 and 491 are normally maintained closed except when records are being changed on the machine 30.

The contacts of the relays which operate with the position registering device, head position switch 234 and the control switch 52 are connected in circuits 495 to 513 inclusive between the No. I head bus 453 and forward and reverse impulse relays IF and IR which control the directional operation of the motor 217. Of the above circuits, circuits 495, 496 and 497 are used to energize certain auxiliary busses 515, 516 and 517, and the remaining circuits 500 to 513 are connected between the busses 515, 516 and 517 and the relays IF and IR. Circuit 495 extends between the No. I head bus 453 and the auxiliary bus 515 and includes a contact of the relay YLR and a normally closed contact of the relay IRC. As explained above the contact of the relay IRC can be assumed as being closed during the operation of the machine by the operator and the YLR contacts of the limit relay LR as will be shown later are closed when the No. I head is operating. The bus 515 is therefore normally energized from the bus 453. Busses 516 and 517 are energized through circuits 496 and 497 from the bus 515 through normally closed and normally open contacts of the master relay MR as will be evidenced from an inspection of the diagram.

The circuits for energizing the relays IF and IR can best be traced by tracing the sequence of operation of the machine. Again assuming that the operator has been dictating on record 102, in which position the head 116 is in the dictating position, and that he wishes to play back part of the recorded dictation, the operator depresses the control button 52 and holds it down. As the No. I head bus 453 is energized in a manner to be subsequently described and the YLR contacts of the limit relay LR are closed due to the toggle mechanism 350 being tripped to its right-hand position, circuit 499 is completed through the contacts of the control button 52 and the master relay MR is energized. The energizing of the master relay MR causes the bus 517 to be energized from the No. I head bus 453 through circuits 497 and 495. As the No. I head, 116, is in the dictating position, the relay ID is energized through circuit 480 and the contacts thereof are closed. The energizing of bus 517 therefore causes power to flow through circuit 500 which includes the contacts of relay ID, to the "on" coil of the relay IR.

The contacts of relays IF and IR are connected in a reversing circuit which supplies power to the motor 217, the contact IF forming a forward circuit 520 and the contact IR forming a reverse circuit 521. Circuits 520 and 521 are simple reversing circuits which are well known to those skilled in the art. The closing of the contacts of the relay IR therefore completes the circuit 521 and causes the motor 217 to move the head 116 in a reverse direction or from dictate towards neutral. As the No. I head 116 moves from the dictating position towards neutral, relay IND is energized through circuit 485 as soon as the No. I head has moved sufficiently far so that the movable contact 244 of the head position switch 234 contacts the switch segment 240N. This causes the contacts of relay IND to close, which completes circuit 504 between the auxiliary bus 517 and the "off" coil of relay IR. This trips the contacts of relay IR to the "off" position, stops the rotation of motor 217, and stops the No. I head in the neutral position.

As will be subsequently described, we also provide certain relays which cause the travel motor 150 to move the carriage 115 in the "Y" direction as soon as the head 116 has reached its neutral position. The head 116 is thereupon moved backward over the recorded portion of the record 102. As soon as the operator reaches the place on the record 102 which he wishes to play back as evidenced to him by the position indicating device 53, he releases the control button 52 which opens the circuit 490 and de-energizes the master relay MR. The de-energizing of the master relay MR de-energizes bus 517 and causes the bus 516 to be energized from the No. I head bus 453 through circuits 496 and 495.

As the head 116 has been moved backward along the record 102 by the carriage 115, the position arm 318 of the position registering device 276 has been left in the advance position so that the contacts 336 and 338 are disengaged, which interrupts the circuit 475 and de-energizes the relay IPR. Energizing of the auxiliary bus 516 therefore causes current to flow over circuit 501 which includes contacts of the relay IND and normally closed contacts of the relay IPR thus energizing the "on" coil of relay IR. This causes the motor 217 to move the head 116 from the neutral position towards the playback position. As the No. I head 116 reaches the playback position, the movable contact 244 makes contact with the switch segment 240P of the head position switch 234 which completes the circuit 481 to relay IP. The closing of the contacts on relay IP completes circuit 595 from the auxiliary bus 515 to the "off" coil of the relay IR and stops the motor 217.

The machine 30 is now in the playback position and the operator may play back the recorded dictation by pressing the foot switch 34 in a manner to be described later. After the desired portion of the record 102 has been played back and the operator wishes to return to the dictating position, he presses the control button 52 and releases it, thus momentarily energizing the relay MR. This causes the momentary energization of the auxiliary bus 517 which causes power to flow over circuit 508 through the contacts of relay IP to the "on" coil of the impulse relay IF.

The contacts of relay IF are then closed which completes the circuit 520 to motor 217 and causes the motor 217 to rotate in the forward direction. This moves the head 116 from the playback position towards the neutral position. As the No. 1 head 116 reaches the neutral position from playback, the movable contact 244 of the head position switch 234 contacts the switch segment 240N and energizes relays IN and INP through circuits 484 and 486 respectively.

As the operator has released the control button 52 and the master relay MR is de-energized, the auxiliary bus 516 is energized through the circuits 496 and 495. Power therefore flows over circuits 512 through the normally closed contact of relay IRC and contacts of the relays INP and IPR to the "off" coil of the forward relay IF which then causes the motor 217 to stop. This leaves the No. 1 head 116 in the neutral position. Certain relays then operate in a manner to be described later to cause the driving motor 150 to move the carriage 115 in the "X" direction. Movement of the carriage in the "X" direction is continued until the contacts 336 and 338 of the position registering device 276 are engaged, at which time the circuit 475 is completed for energizing the relay IPR. Movement of the carriage in the "X" direction is then automatically stopped as will appear later. The energization of the relay IPR completes circuit 511 from the auxiliary bus 515 through contacts of the relay INP and normally open contacts of the relay IPR to the "on" coil of the forward relay IF. The motor 217 is thereupon energized through the circuit 520 to move No. 1 head from neutral towards the dictate position. When the dictate position is reached, relay ID is energized through circuit 480. The closing of the contacts of relay ID completes circuit 513 from the bus 515 to the "off" coil of relay IF which stops the rotation of motor 217 and leaves the No. 1 head 116 in the dictate position.

We have traced above the normal operation for moving the head from the dictate position to neutral and into the playback position and from playback to neutral and to the dictate position. This operation may be summarized as follows: With the No. 1 head 116 in the dictate position, the operator presses the control button 52 and holds it down. This causes the No. 1 head to move from the dictate position to neutral and stop and the carriage 115 to then move in the Y direction. When the operator releases the control button 52 the No. 1 head is moved from the neutral position to the playback position, in which position the operator can play back certain of the recorded material. When playback is completed the operator again presses the control button 52 and releases it. This causes the No. 1 head to move from the playback position to neutral, the carriage 115 to move along the record to the place where the dictation was stopped and the head to move from the neutral position to dictate.

The above is the normal operating sequence for moving between the dictate and playback position, but we have also provided for certain abnormal conditions. If the No. 1 head 116 is in the dictate position and the operator depresses the control button 52 and releases it immediately, the operation is as follows: The master relay MR is first energized and then de-energized which causes the bus 517 to be momentarily energized and then the bus 516 to be energized. When the bus 517 is energized the circuit 500 is completed in the same manner as in normal operation, causing the relay IR to close its "on" contacts and start the rotation of the motor 217 to move the No. 1 head from the dictate position towards neutral. When the neutral position is reached circuits 484 and 485 are completed which energize relays IN and IND.

As the contacts 336 and 338 of the position registering device 276 are engaged, circuit 475 is completed and relay IPR is also energized. Since the bus 516 has been energized by the releasing of the control button 52 circuit 503 is therefore completed from auxiliary bus 516 through contacts of relay IND and IPR to the "off" coil of relay IR, thus stopping the motor 217. At the same time circuit 510 is completed from bus 516 through contacts IND and IPR to the "on" coil of the relay IF. This causes the motor 217 to move the No. 1 head forward towards the dictate position, movement of the No. 1 head being stopped when the dictate position is reached by the completion of circuit 513 through the contacts of relay ID which energizes the "off" coil of relay IF.

It will thus be seen that if the operator presses the control button 52 and immediately releases it while the head 116 is in the dictate position, the No. 1 head 116 will be moved from the dictate position to the neutral position and immediately back to the dictate position.

Another abnormal condition exists in case the No. 1 head 116 is in the playback position and the operator presses the control button 52 and holds it down instead of releasing it as in the normal operation. In this case the master relay MR energizes the bus 517 and power flows over the circuit 508 to the "on" coil of relay IF which causes the motor 217 to move No. 1 head towards the neutral position. When the neutral position is reached circuit 502 is completed from the bus 517 through the normally closed contact of relay IRC, the contact of relay INP, and the normally closed contact of relay IPR to the "on" coil of relay IR. This causes the contacts of both relays IF and IR to be closed at the same time. It will be noted by referring to circuits 520 and 521 that the contacts of relays IR and IF are arranged with normally closed contacts so that in case both relays are energized at the same time, the circuit to the armature of the motor 217 is opened and the motor 217 is stopped. This condition will continue until the control button 52 is released.

Releasing control button 52 de-energizes bus 517 and energizes bus 516. Circuit 506 is then completed from bus 516 through the contact of the relay INP to the "off" coil of relay IR. Simultaneously circuit 512 is completed to the "off" coil of relay IF. This is the condition under normal operation and the operation is thereupon the same as has been previously described for normal operation. The carriage 115 is thereupon moved in the "X" direction until the contacts 336 and 338 of the position registering device are engaged and the relay IPR is energized. Circuit 511 is then completed through the contacts of relay INP and the contact of relay IPR to the "on" coil of relay IF. Energization of the "on" coil of relay IF causes the carriage 115 to stop in a manner to be shown later. Circuit 520 is then completed through the contacts of relay IF and the motor 217 is caused to rotate in the forward direction until the No. 1 head has been moved to the dictating position in which it is stopped by power flowing over circuit 513 in a manner previously described.

Another operating condition which often occurs in the operation of a dictating machine is the condition where the operator has played back a portion of the recorded dictation at some distance back on the record and wishes to play back certain of the dictation which is recorded between the portion just played back and the place where dictation was stopped. In order to accomplish this operation, the operator presses the control button 52 and releases it in a conventional manner, thus causing the No. 1 head to move from the playback position to neutral and the carriage 115 to move in the "X" direction. When the carriage 115 is moved to that portion of the record which the operator wishes to play back as evidenced to him by the position indicating device 53, he presses the control button 52 a second time, and releases it. As will be shown later, the carriage 115 is immediately stopped and the pressing of the control button 52 causes a momentary energization of the bus 517. Power then flows from this bus 517 through circuit 502 which includes normally closed contacts of relay 1RC and relay 1PR, and contacts of relay 1NP to the "on" coil of relay 1R. This causes the motor 217 to be energized for reverse rotation of the No. 1 head so as to move this head to the playback position. When the playback position is reached movement of the No. 1 head is stopped by power flowing over circuit 505 from the bus 515 to the "off" coil of relay 1R which stops movement of the No. 1 head.

It will be seen from the above that the control button 52 may be made to control the position and the function being performed by head No. 1. We likewise provide similar control for head No. 2, except that the head No. 2 control circuits are connected to the No. 2 head bus, which bus 454 is energized when recording with head 117.

We have accordingly shown the head position switch 235 of No. 2 head 117 as being connected to relays 2D, 2P, 2X, 2N, 2ND and 2NP by circuits 530 to 536. The connection for these relays and circuits is identical with the connections for those of No. 1 head with the exception that the moving contact 244 of the position switch 235 is connected to the No. 2 head bus 454 instead of the No. 1 head bus 453. The contacts for the above relays are connected in circuits 545 to 571 inclusive to the coils of relays 2F and 2R which correspond to relays 1F and 1R and are used to control the direction of rotation of the motor 218. It will be noted that the operation for No. 2 head is identical with that of No. 1 head, it being only necessary to energize the No. 2 head bus in place of No. 1 head bus and to trip the toggle mechanism 350. XLR contacts of relay LR are then closed and circuit 478 is completed to relay 2PR whenever contacts 337 and 339 are engaged. The complete control for changing over from one record to another will be described later.

It should be noted that the switching mechanism 465 is connected to bus 455, and to bus 452 by circuits 470 and 471 which include contacts of the relays 1P and 2P respectively. It will be seen that whenever either No. 1 head or No. 2 head is in the playback position, contacts of the relays 1P and 2P are closed and either circuit 470 or 471 is completed energizing the switching mechanism 465. As previously mentioned, energization of the switching mechanism 465 connects the sound system 450 for reproducing.

The relay circuits by which the motor 150 is caused to rotate so as to move the carriage 115 in the proper direction depending upon the position of No. 1 and No. 2 heads will now be described. This operation is secured by two relays which we term X and Y relays because the contacts thereof are connected in the circuits to the motor 150 to cause this motor to move the carriage 115 to the "X" and "Y" directions respectively. It will be noted from our previous descriptions that in connection with No. 1 head, travel of the carriage 115 in the X direction is desired whenever the No. 1 head is moved from the playback position to neutral. We therefore connect the X relay between No. 1 head bus 453 and bus 455 in a circuit 580 including a contact of relay 1NP. It will thus be seen that whenever No. 1 head is moved to neutral from playback the X relay will be energized.

The contacts for relays X and Y are connected in reversing circuits 594 and 595 which supply the motor 150 and which are connected between the busses 452 and 455. Upon energization of the proper clutches, energization of relay X will cause the motor 150 to rotate in the proper direction to move the carriage 115 in the "X" direction and energization of the Y relay will cause the carriage 115 to move in the "Y" direction.

Also in connection with No. 1 head it is desired that the motor 150 move the carriage 115 in the "X" direction whenever the No. 1 head is in the dictate or playback position, this being the proper direction of movement for dictation and playback with No. 1 head. We therefore connect the X relay in circuits 581 and 582 with contacts of relays 1D and 1P respectively.

As previously shown, when No. 1 head is moved to neutral from dictate, movement of the carriage 115 in the "Y" direction is desired, and we have therefore connected contacts of relays 1ND and 1RC in circuit 588 which energizes the coil of the "Y" direction relay. The contacts of relay 1RC are normally closed and as previously stated can be considered as being closed whenever the operator is controlling the machine 30. It will thus be seen that the motor 150 is rotated to move the carriage 115 in the "Y" direction whenever the No. 1 head is moved to neutral from dictate.

In a similar manner relays X and Y are connected between busses 455 and No. 2 head bus 454 to secure the proper direction of rotation of the motor 150 when head No. 2 is operating. These connections include circuits 584, 589, 590 and 591 and it will be noted that the connections for these circuits cause the motor 150 to rotate for moving the carriage in the "Y" direction when No. 2 head is in the dictate, playback or neutral from playback positions. Rotation for "X" direction movement is secured when No. 2 head is in neutral from dictate position.

In the circuits with the coils of relays X and Y we have connected the directional limit switches 380 and 381 respectively. It will thus be seen that we have provided for limiting the travel of the carriage 115 in case the carriage 115 is moved sufficiently to open either of the limit switches 380 or 381, this being secured by de-energizing the motor 150 to prevent further travel in the overtraveled direction.

We have shown the contacts of the relays X and Y arranged for reversing the direction of rotation of one type of constant speed motor, but it is obvious that these connections can be varied by anyone skilled in the art to reverse the direction of any type of motor which may be used as the motor 150.

We have shown above, the method by which the motor 150 is caused to rotate to move the carriage 115 in the proper direction, depending upon the position of heads No. 1 and No. 2. We will now explain the connection by means of which the various clutches are engaged so as to cause the carriage 115 and the records 102 and 103 to be moved at the proper speed for securing proper operation of the machine 30. It will be noted from the above that whenever either No. 1 head or No. 2 head is in the neutral position it is desirable to have the carriage 115 moved at high speed by the motor 150. We therefore connect the high speed clutch 159 between the busses 452 and 455 in circuits 600 and 601 which includes contacts of relays 1N and 2N respectively, and "off" contacts of relays 1F, 1R, 2F, and 2R. It will therefore be obvious that whenever either No. 1 head or No. 2 head is moved to the neutral position, either relay 1N or 2N will be energized and circuit 600 or 601 will be completed provided relays 1F, 1R, 2F, and 2R are in the "off" position. This will energize the high speed clutch 159 and cause the carriage 115 to move at high speed along the records 102 and 103, the proper direction of rotation being secured by the relays X and Y operating as previously described. It is also obvious that high speed travel of the carriage 115 is impossible unless all shifting operations of head No. 1 and head No. 2 are completed and relays 1F, 1R, 2F, and 2R are in the "off" position.

It will be noted from the previous description of the machine that whenever the machine is to record or reproduce from the records 102 and 103, certain conditions must be set up. In the first place, the machine must be operated at slow speed by engaging the slow speed clutch 158. One of the record clutches 134 or 135 must be then engaged to operate the record associated therewith for recording and reproducing. Also, either head No. 1 or head No. 2 must be in the dictate or playback position. Further, the starting and stopping of the records 102 and 103 are controlled by the energization of the slow speed clutch 158 and one of the record clutches 134 or 135 must be controlled by the foot switch 34.

We secure the above results by connecting the equipment in a manner now to be described. We connect contacts of relays 1D and 1P in circuits 604 and 605 respectively between No. 1 head bus 453 and an auxiliary bus 608. Contacts 2D and 2P are likewise connected in circuits 606 and 607 between No. 2 head bus 454 and the auxiliary bus 608. This arrangement provides that whenever either No. 1 head or No. 2 head is in the dictate or playback position, one of the circuits 604, 605, 606 or 607 will be completed and the bus 608 energized.

We also connect the foot switch 34 in a circuit 611 extending between the bus 608 and a bus 614 so that the closing of the foot switch 34 will cause the bus 614 to be energized from the bus 608. The slow speed clutch 158 is connected in a circuit 617 which extends between the bus 614 and the main bus 455. We also connect between the busses 614 and 455, the record clutches 134 and 135 in circuits 618 and 619 respectively. Also in circuits 618 and 619 we connect contacts 1BR and 2BR of a bus relay BR whose connections will be more fully described later, but whose function is to energize the No. 1 head bus 453 or No. 2 head bus 454 when operation of No. 1 or No. 2 heads is to be secured. The bus relay BR therefore completes either circuit 618 or 619 between the busses 455 and the bus 614 so that the proper one of the record clutches 134 or 135 is energized at the time the bus 614 is energized.

It will be noted that we have provided electrical circuits whereby proper operation of the equipment is secured during reproduction and recording. This operation may be traced as follows: If one of the heads No. 1 or No. 2 is in the dictate or playback position, one of the circuits 604, 605, 606 or 607 is completed which energizes the bus 608. If now the foot switch 34 is depressed by the operator to cause the machine 30 to operate for dictation or playback, the bus 614 will be energized through circuit 611. This will in turn energize the slow speed clutch 158 and one of the record clutches 134 or 135 depending upon which of the heads is recording or reproducing.

It has been shown above how the motor 150 is caused to rotate in the proper direction depending upon which of the heads is recording or reproducing and it should be noted that when the machine 30 is energized the motor 150 is caused to rotate at all times when one of the heads No. 1 or No. 2 is in the dictate or playback position. As explained previously, through the use of a time delay relay TDR the depressing of the foot switch 34 energizes the machine and it will remain energized for a definite period even if the dictation is discontinued. If dictation is resumed within a period prior to the operation of this relay TDR the machine 30 is not deenergized for the relay TDR is again reset. The motor 150 is thus operating at constant speed and engagement of the clutches 158 and one of the record clutches 134 or 135 causes the record associated therewith to be almost instantly brought up to speed. When the record clutch associated with the record which is in operation is de-energized, the record is quickly stopped due to the braking action of the clutch as previously explained.

It will be further noted that the foot switch 34 is inoperative unless one of the heads is in the dictate or play-back position due to circuits 604, 605, 606 and 607 being opened. It is therefore not necessary for the operator to remove his foot from the foot switch 34 in case he has been dictating and wishes to play back or vice versa. The pressing of the control button 52 causes the operative head to move from the playback or dictate position to neutral which deenergizes the bus 608 and stops the rotation of the records even though the foot switch 34 is held closed. When the head again moves to dictate or playback position the bus 608 is again energized and normal control of the machine through the use of the foot switch 34 is regained by the operator.

As wax chips are cut from the records 102 and 103 only at such times as the records are being recorded, we connect the vacuum fan 78 in circuits 620 and 621 through contacts of the relays 1D and 2D respectively and extending between bus 452 and 455 so that wax will be removed at such times as head No. 1 or head No. 2 is in the dictate position. It is obvious that the fan 78 may also be connected for other operating conditions if desired.

As previously explained, we have found that it is psychologically important that the operator have an indication when the records 102 or 103 are rotating during recording or reproduction. We have therefore connected the switch 410 which is operated by the advancing screw 128 in a circuit 622 with a relay L and extending between the bus 614 and the main bus 455. Since the bus 614 is energized only during recording and reproducing, the relay L can only receive power at such times. It will also be noted that the circuit through the switch 410 is alternately closed and opened only when the advancing screw 128 is rotating. The relay L is therefore energized intermittently whenever the machine is recording or reproducing.

Normally closed contacts of the relay L are connected to the main bus 452 and are included in circuits which supply the indicating lights 56 and 57. The indicating light 56 is supplied through circuits 625 and 626 which include in addition to the contacts of the relay L contacts of relays 1D and 2D respectively. Likewise, indicating light 57 is supplied through circuits 627 and 628 which include contacts of relays 1P and 2P in addition to the contacts of relay L.

It will be seen from the above connection that the indicating light 56 receives energy when either contacts 1D or 2D are closed, this corresponding to the dictate position for heads No. 1 and No. 2. Likewise, the indicating light 57 receives energy only when the heads are in the playback position. Further, the particular connection of the relay L in the circuit 622 insures that this relay L will be energized only when the records are being recorded or reproduced and that this relay will be energized only momentarily due to the closing of the contacts of the switch 410. The location of the contacts in the circuit supplying the indicating lights 56 and 57 thus provide for blinking the light as the records 102 and 103 rotate during recording or reproducing. It will be noted that in case the foot switch 34 is opened to stop the machine with the contacts of the switch 410 in engagement the lights 56 and 57 will not be left de-energized because the relay L will be de-energized due to the opening of the circuit 611 by the foot switch 34 and its contacts will be closed, completing the circuits to the lights 56 and 57.

As stated the psychological effect of the operator knowing when the cylinders are turning is desirable, however, it should be noted that this indication is not essential and can be readily eliminated without interfering with the operation of the machine.

The connections for the end of record buzzer 61 are next shown in the wiring diagram. It will be noted that the switch segments 395 and 396 are connected by circuits 630 and 631 to the head busses 453 and 454 respectively. The contact shoe 397 which engages the segments 395 or 396 is connected to a bus 632 and the end of record buzzer 61 is in turn connected by circuit 633 between the bus 632 and the bus 455. It will be noted that whenever the carriage 115 is moving in the "X" direction with the No. 1 head bus 453 energized for control on the head No. 1, and the carriage 115 approaches the end of record 102, the contact shoe 397 makes contact with the segment 395 and the circuit is then completed through the circuits 630 and 633 causing the end of record buzzer 61 to operate. Similarly, when the carriage 115 approaches the end of record 103 with the No. 2 head bus 454 energized, the contact shoe 397 makes contact with the segment 396 and completes a circuit through circuits 631 and 633 which causes the end of record buzzer 61 to operate. It should be noted, however, that if the No. 1 head bus 453 is energized and the carriage 115 is moved in the backward or "Y" direction and the contact shoe 397 makes contact with the switch segment 396 the circuit to the end of record bell 61 is completed to a de-energized bus 454 and the buzzer 61 does not operate.

We have found that even though the segments 395 and 396 are made very narrow so that the end of record buzzer 61 does not operate for a long period, it is possible for the operator to release the foot switch 34 at a point such that the contact shoe 397 will stop on one of the segments 395 or 396 and cause the buzzer 61 to operate until the operator has again depressed the foot switch 34 and moved the carriage 115 along the records 102 and 103. We have therefore connected a relay B in parallel with the buzzer 61 by a circuit 634 so that the relay B will be energized at the same time as the end of record buzzer 61. We have connected the contacts of the relay B in a circuit 613 which extends between the busses 608 and 614 and parallels the contacts of the foot switch 34. Thus, whenever the buzzer 61 is energized, the relay B is also energized and its contacts maintain the circuit 613 between the busses 608 and 614 sufficiently long to move the contact shoe 397 from engagement with the segment 395 or 396. This prevents continuous operation of the buzzer 61.

*Record changeover*

The equipment by which the changeover is made from recording on one record to the other, includes the bus relay BR which operates in conjunction with the limit relay LR. The bus relay BR is of the impulse type and the coils 1BR and 2BR thereof are connected in circuits 637 and 638. Coil 1BR is connected in circuit 637 which extends from No. 2 head bus 454 to bus 455 and includes contacts of relays 2N and YLR. Likewise, coil 2BR is connected in a circuit 638 extending between No. 1 head bus 453 and bus 459 which circuit 638 includes contacts of relays 1N and XLR. The contacts of relay BR are connected to energize the No. 1 or No. 2 head busses 453 or 454 from the main bus 452 so that when the coil 1BR is energized, the bus relay BR is tripped so that the 1BR contact closes a circuit 640 between the bus 452 and the No. 1 head bus 453. Also, when the coil 2BR is energized, contacts 2BR close a circuit 639 between the bus 452 and the No. 2 head bus 454.

In order to trace the operation which produces changeover from one record to the other, let us assume that the operator is dictating with No. 1 head on record 102. As the operator approaches the end of record 102, the end of record buzzer 61 is momentarily sounded indicating that the end of the record is being approached and that the changeover is about to take place. We intend to provide sufficient space between the sounding of the end of record buzzer 61 and the end of the record where changeover takes place so that the operator may finish a sentence or give whatever instructions he may wish at the end of the record. The operator then leaves the machine in the position for dictating on record 102 and continues to depress the foot switch 34 until the carriage 115 reaches the end of the record 102.

At this point the toggle mechanism 350 is tripped in a manner previously explained. The tripping of the toggle mechanism 350 opens the contacts 373 and 374 and closes the circuits between the contacts 371 and 372. This energizes the XLR coil of limit relay LR through circuit 476 and trips the limit relay LR to the XLR position. As the position arm 319 has been maintained adjacent to the arm 304 due to the engagement of the hook 364 with the arm 319, the contacts 337 and 339 are therefore in engagement and the tripping of the toggle mechanism 350 to the left hand position completes circuit 478 and energizes relay 2PR.

The tripping of the limit relay LR from the YLR position to the XLR position sets up the circuits by which the changeover is started for No. 1 head. It should be remembered that at this time the No. 1 head bus 453 is energized and the No. 2 head bus 454 is de-energized. Referring therefore to the control for the head drive on No. 1 head, it will be noted that the YLR contact opens circuit 495 and closes a circuit 518 through an XLR contact so that the bus 517 is energized from the No. 1 head bus 453. At the same time, the circuit 490 to the master relay MR is open and any further manual control of the head drive by control button 52 is thus prevented until the changeover is completed. When bus 517 is energized with the No. 1 head in the dictate position the proper circuits are established for moving the No. 1 head from the dictate position to neutral, this operation being secured by the energization of the "on" coil of the relay IR through circuit 500 and the energization of the "off" coil of the relay IR through circuit 504 when the No. 1 head has reached the neutral position.

Referring now to the circuits for relay BR, it will be noted that the tripping of the limit relay LR to the XLR position opens the circuit 637 and completes part of the circuit 638. When the No. 1 head reaches the neutral position the contact IN is closed and this completes the circuit 638 causing the coil 2BR of the bus relay BR to be energized from No. 1 head bus 453. This causes the bus relay BR to trip from the IBR position to the 2BR position which transfers energy from No. 1 head bus 453 to No. 2 head bus 454 through circuit 639. As all of the relays which function with No. 1 head are energized from the No. 1 head bus 453 only, the de-energizing of the No. 1 head bus 453 completely de-energizes the control for No. 1 head and energizes that for No. 2 head.

As No. 1 head was in the neutral position when the controlling relays for its drive were de-energized, the No. 1 head will remain in this position until No. 1 head bus is again energized. This is the inoperative position in which the No. 1 head is out of engagement with the record 102 and is also the position in which the No. 2 head is held when changeover between the No. 1 head bus and the No. 2 head bus is completed. The energization of the No. 2 head bus 454 therefore completes the circuit 545 due to the XLR contact being closed and energizes the No. 2 head auxiliary busses 565 and 566. As the position relay 2PR is now energized as previously explained, power may therefore flow over either circuit 560 or 561 to the "on" coil of relay 2F. This causes the motor 218 to be energized to move the No. 2 head from the neutral position to the dictate position. When the dictate position is reached, the circuit 563 is completed to the "off" coil of relay 2F and the motor 218 is stopped. The No. 2 head is now in the dictate position and is ready for further dictation by the operator.

The control of the head drives by means of the control button 52 was re-established as soon as the No. 2 head bus 454 was energized by the tripping of the bus relay BR. This was accomplished by the energization of the No. 2 head bus which completed the circuit 491 whereby power may flow through the control button 52 to the master relay MR. This again provides the operator with complete control of the machine.

We have also provided contacts of the relay BR which automatically connect the proper recording head to the sound system 450. These include contacts IBR and 2BR of the bus relay BR which are connected in circuits 468 and 469 for respectively connecting head No. 1 or head No. 2 to the switching mechanism 465. It will be seen that the closing of contact IBR of the bus relay BR completes the circuit 468 and connects No. 1 head to the switching mechanism 465, and the closing of contact 2BR of the bus relay BR completes the circuit 469 and connects No. 2 head to the switching mechanism 465.

The above description of the changeover from one record to the other may be briefly summarized as follows: With the operator dictating on record 102, the approaching end of the record is indicated by the sounding of the buzzer 61 and as the operator continues to dictate on the record 102, the end of the record 102 is reached and the toggle mechanism 350 is tripped. The tripping of the toggle mechanism 350 changes the connections for the limit relay LR which opens the circuit to the control button 52 and at the same time sets up a new condition for the control of No. 1 head. This control condition causes the No. 1 head to move from the dictate position to neutral. When the No. 1 head reaches neutral the circuit is completed to change over the bus relay BR which de-energizes No. 1 head bus and energizes No. 2 head bus. The energization of the No. 2 head bus causes the No. 2 head to move from the neutral position to the dictate position and at the same time again makes the control button 52 operative so that the operator now has complete control of the machine.

While the above operation of changing over the recording from one record to the other appears quite lengthy when described in connection with the circuits, the actual operation of changing over is only a matter of a few seconds. The length of time required for the changeover is approximately that required to move No. 1 head to the neutral position and move No. 2 head from the neutral position to the dictate position. This length of time is actually very small as compared with the length of time which is necessary in the changing of records on the conventional dictating machine in which one record must be removed and another record placed on the machine before dictation can be resumed.

It should be noted that although we have described the operation of the changeover and other functions of the machine in connection with the recording of dictation by No. 1 head on record 102 it should be understood that the operation is identical with No. 2 head recording on record 103. Likewise changeover from recording on record 103 to recording on record 102 is accomplished in the same manner as has just been described for the changeover from recording on record 102 to recording on record 103. It is intended that in the normal operation of the machine, the operator may dictate to the end of one record, at which time the equipment changes over for recording on the other record and the operator continues to record on the second record. When changeover is made an attendant in the office may be given a suitable signal that recording has been finished on the first record. The attendant may then remove from the machine and replace it with a clean record while the operator is dictating on the second record. When the operator has finished recording on the second record and reached the end of that record, the changeover back to the first record will be accomplished automatically and the operator can then continue to dictate on another record which has replaced the first record. If the second record is replaced by a clean record, the operator may thus continue to dictate almost continuously as long as clean records are maintained on the machine by an attendant.

Certain of the auxiliary equipment also operates in conjunction with contacts of the bus relay BR. These devices include the solenoids 404, 405, 406, and 407 of the marking equipment. It will be noted that we have connected the error solenoid 404 associated with No. 1 head in a circuit 644 which extends from bus 452 to bus 455 and includes the error push-button 59 and contact 1BR of the bus relay BR. We have likewise connected the error solenoid 405 associated with the No. 2 head in a circuit 645 which also includes the error push button 59 and contact 2BR of the bus relay BR. In a like manner we have connected the solenoids 406 and 407 for indicating the length of letters in circuits 646 and 647 which includes the length of letter push button 60 and the contacts of the relay BR. It will be noted from the above that the error push button 59 and the length of letter push button 60 are connected by the bus relay BR to control the error solenoid 404 and the length of letter solenoid 406 associated with the head No. 1 when recording is being accomplished on record 102, likewise error push button 59 and length of letter push button 60 are connected to control error solenoid 405 and length of letter solenoid 407 associated with head No. 2 when recording on record 103.

The contacts of relay BR also operate to changeover the connections for the indicating device 53 so that the indicating device 53 indicates alternately the position of the carriage 115 relative to the records 102 and 103. We connect the resistance 308 between the busses 452 and 455 by means of two sets of contacts of the relay BR so that in one position of the relay BR a circuit 650 is completed which connects one end of the resistance 308 to bus 452 and the other end of the resistance to bus 455. In the other position of the relay BR, a circuit 651 is completed in which the resistance 308 is connected in the opposite position relative to the busses 452 and 455. We also connect the contact shoe 312 which engages a resistance 308 to the position indicating device 53 and to the bus 455 by a circuit 652.

It will be noted by those skilled in the art that the above connections connect the resistance 308 as a potentiometer across the busses 452 and 455 so that with a constant potential between these busses 452 and 455, the voltmeter 53 will indicate accurately to the operator the position of the carriage 115 relative to the records 102 or 103. Since it is necessary for the indicating device 53 to indicate the position of either of the heads 116 or 117 relative to the length of the records 102 or 103 the reversible connections of the contacts of the relay BR provide for accomplishing this result.

It will be observed that our invention is not limited to the use of dual records. It is operative and may be operated successfully through the use of one record. The foregoing changeover system from one record to another is extremely desirable for it gives the operator a number of conveniences which otherwise he would not have, for example, the ability to continue the dictating almost continuously, providing an attendant changes the records on the machine as they become filled with the dictation completed.

Record changing equipment

As previously stated, it is possible that the operator may have recorded only a portion of a record and is desirous of having that portion of the record transcribed before dictating further. In this case it is necessary to provide some means whereby an attendant may remove the recorded record from the machine. It should be noted from the above description of the controlling equipment for the head drives that the head which has just been in use will be left in either the dictate or playback position and not in the neutral position. This makes it impossible for the operator to remove the dictated record from the machine without damaging the recorded dictation unless the head is moved to the neutral position. As the machine is mechanically operated and not manually operated, suitable driving means must therefore be provided whereby the head may be moved out of contact with the record to permit the removal of the record.

This equipment we have termed the "record changing equipment" which operates in conjunction with the record changing push button, 451 previously referred to. The record change push button 451 is connected in circuits with record change relays 1RC and 2RC which are respectively associated with head No. 1 and head No. 2. Since the record changing may be accomplished by an attendant at such times when the machine is not being operated by an operator, the bus 452 will therefore not normally be energized at such times as it is desired to change the record. The record change push button 451 is therefore connected from the normally energized bus 460 through circuits 657 or 658 through YLR or XLR contacts of the limit relay LR to the record changing relays 1RC or 2RC.

The above connections provide for energizing one or the other of the record changing relays 1RC or 2RC when the contacts of the record change push button 451 are engaged. The particular circuit which is completed depends on the position of the relay LR. For example, if we assume that part of the record 102 has been recorded and it is desired to change this record, the pressing of the record change button 451 will complete a circuit 657 through YLR contacts of the relay LR, which contacts are normally closed after operation with No. 1 head, and energize record change relay 1RC. Likewise, when the XLR contacts are closed and the record change push button 451 is pressed, a circuit 658 is completed which will energize record change relay 2RC.

In order to permit the operator to release the record change push button 451 immediately so as to leave the operator's hands free for removal of the record, we connect contacts of the record change relay IRC between the No. I head bus 453 and the relay IRC through circuit 656. Contacts of relay 2RC are likewise connected between No. 2 head bus 454 and relay 2RC through a circuit 659. We likewise connect contacts of record changing relays IRC and 2RC in circuits 665 and 666 which connect the normally energized bus 460 to the bus 452 so that whenever either one or the other of the record changing relays IRC or 2RC is energized, the bus 452 will be energized through circuit 665 or 666. Either the No. I head bus or the No. 2 head bus will then be energized through the proper contacts of the bus relay BR from the bus 452 in a manner previously described which will energize the relays associated therewith for operation.

It will thus be seen that when the attendant has pressed the record change push button 451 and energized either of the relays IRC or 2RC, a holding circuit is established for these relays so that the operator may release the record change button 451 and the record change relay will stay energized until the function is completed. For example, let us assume that part of record 102 has been dictated and it is desired to remove the record from the machine. When the record change push button 451 is pressed, the record change relay IRC will be energized through circuit 657 in a manner previously described. The contacts of record change relay IRC will then close which completes the circuit from the normally energized bus 460 through circuit 665 to bus 452, and through circuit 640 which is closed by the IBR contact of the bus relay BR to bus 453 and through circuit 656 and contact IRC to the relay IRC. This creates a parallel circuit around the record change push button 451 and maintains the record change relay IRC in a closed position. A similar holding circuit is formed for record change relay 2RC through circuits 666, 639 and 659, in case part of the record 103 was recorded and it is desired to remove this record from the machine.

As previously described, we also connect contacts of record change relay IRC and 2RC in circuits 490 and 491 which supply the master relay MR through the control button 52. The contacts of these relays IRC and 2RC are normally closed so that when either of the relays IRC or 2RC are energized, circuits 490 and 491 are interrupted and control of the machine by means of control button 52 is prevented until the record change is completed.

Also as previously stated, we connect normally closed contacts of the record change relays IRC and 2RC in circuits 495 and 545 which supply energy to the head control relays IF and IR and 2F and 2R. We further connect normally open contacts of relay IRC in a circuit 519 which extends between No. I head bus 453 and the auxiliary bus 517 of No. I head, and also provide normally open contacts of record change relay 2RC which are connected in a circuit 569 which extends between No. 2 head bus 454 and the auxiliary bus 567 of No. 2 head.

The operation for changing records by means of the record change relays IRC and 2RC is as follows: Let us assume that the operator has finished recording on record 102 and that the No. I head 116 has been left in the dictate position. The operator has signalled an attendant that record 102 is to be removed from the machine for transcription. The attendant presses the record change push button 451 which energizes relay IRC through circuit 657 in a manner previously described. The contacts of relay IRC which are included in circuit 665 and 656 close and maintain the relay IRC energized after the record change push button 451 is released in a manner also previously described. Further, the contacts of relay IRC which are connected in circuit 490 open and interrupt circuit 490 so that the operator has no further control of the machine through control button 52. Simultaneously, contacts of record change relay IRC open circuit 495 and close circuit 519.

It will be noted that the connections which are now set up for the No. I head relays IF and IR is identical with the condition which is set up during changeover from one record to the other. This causes the No. I head to move from the dictating position to neutral and stop. The circuit for accomplishing this being as follows: Power flows from No. I head bus 453 through circuit 519 to bus 517 and through circuit 500 to the "on" coil of relay IR. When No. I head reaches the neutral position, power then flows from the bus 517 through circuit 504 to the "off" coil of relay IR.

It should be noted at this time that whenever the head which is in operation at the time the record change operation is started is moved out of either the dictate or playback positions, control by the foot switch 34 is prevented in a manner previously described. Thus, we have provided means of blocking all operation from the control pad 32 by the foot switch 34 or the control button 52 during such time as a record changing operation is in progress.

As soon as No. I head 116 has reached the neutral position, certain connections have been established whereby the carriage 115 is caused to move at high speed in the "X" direction instead of the "Y" direction as is normal. These connections are established in connection with relay X and may be traced as follows: Power from the No. I head bus 453 flows through the contacts of relay IND, but instead of flowing through circuit 588 to the coil of relay Y, the tripping of relay IRC has opened the circuit 588 and closed a circuit 587 which connects the contacts of relay IND to relay X. This causes the motor 150 to rotate for movement of the carriage 115 in the "X" direction. Since No. I head is in the neutral position, power flows from main bus 452 through circuit 600 to the high speed clutch 159 which is thereby energized causing the carriage 115 to move in the "X" direction at high speed.

It will be remembered that under normal conditions with No. I head energized, movement of the carriage 115 in the "X" direction is stopped immediately upon the engagement of contacts 336 and 338 of the position registering device 276. This is caused by the energization of relay IPR through circuit 475 which in turn closes circuit 510 energizing the "on" coil of relay IF whose normally closed contacts interrupt the circuit 600 to the high speed clutch 159.

However, in the case of record change, busses 515 and 516 have been de-energized by the opening of circuit 495. This prevents the head control relay IF from being energized through circuit 510 with the result that the No. I head 116 remains in the neutral position and the high speed clutch 159 remains energized. Movement of the carriage 115 in the "X" direction therefore continues at high speed until the end of record 102 is reached, at which time the toggle mechanism 350 is tripped.

It will be noted that the connections are now approximately the same as for changeover between records, except that record change relay 1RC is still energized. The tripping of the toggle mechanism 350 energizes the XLR coil of relay LR through circuit 476. Since head No. 1 is in the neutral position, the circuit 638 to bus relay BR is completed which causes the bus relay BR to trip to the 2BR position in which No. 2 head bus is energized. The tripping of the toggle mechanism 350 and the de-energization of the No. 1 head bus 453 removes the source of energy supplying relay 1RC through circuit 656. Relay 1RC therefore opens. The opening 1RC also opens the circuit 665 which supplies power to the main bus 452 from the normally energized bus 460. This completely de-energizes all of the relays. The equipment therefore remains in the last operated position in which both of the heads No. 1 and No. 2 are in the neutral position and all of the impulse relays are tripped in the position to supply energy to No. 2 head bus when the main bus 452 is again energized.

Since both head No. 1 and head No. 2 are in the neutral position, the attendant may then remove either or both of the records 102 and 103 and place new records on the machine. After the records have been replaced on the machine, the attendant may signal the operator that the machine is again ready for operation. It will be noted that when the main bus 452 is again energized as by the operator depressing the foot switch 34 which energizes the time delay relay TDR and through its contacts, the bus 452, the No. 2 head will immediately move to the dictate position in a manner previously described in connection with the changeover between records.

The foregoing description applies when the machine has been left in the dictate position. In case the machine has been left in the playback position, the operation is as follows: Pressing the record change push button 451 closes relay 1RC, energizes busses 452 and 453 and auxiliary bus 517 in a manner previously described. Circuit 508 is then completed through contact 1P from auxiliary bus 517 to the "on" coil of relay 1F, causing the No. 1 head to move to the neutral position. As soon as No. 1 head reaches the neutral position, circuit 514 is completed from auxiliary bus 517 through contacts 1RC, 1NP and contacts 1PR to the "off" coil of relay 1F. It should be noted at this point that the normally closed contact 1RC in circuit 502 is now open. This prevents energizing the "on" coil of relay 1R and thus prevents interruption of the circuits to motor 217 and clutch 159.

As soon as relay 1NP closes, circuit 580 is completed to the relay X and the carriage 115 is caused to travel at high speed in the "X" direction. From this point operation is the same as has already been described in connection with a record change operation which starts with No. 1 head in the dictate position.

The operation during the changing of records may be briefly summarized as follows: With the equipment in the position in which it is left after operating with No. 1 head, the attendant depresses the record change push button 451. This energizes record change relay 1RC which establishes its own holding circuit and at the same time energizes main bus 452 from the normally energized bus 460. The contacts of record 1RC in circuit 490 which supply the master relay MR prevents the operator from operating the equipment through the control button 52 until the record change has been completed. At the same time, contacts of record change relay 1RC in circuit 495 and 519 which supply the control relays for No. 1 head open circuit 495 and close circuit 519. This causes the No. 1 head to move from the dictate position or playback position to the neutral position and stop.

Connections are thereupon established by the head position relays which cause the motor 150 to rotate and drive the carriage 115 in the "X" direction. This movement of the carriage 115 in the "X" direction is continued until the end of record 102 is reached at which time the toggle mechanism 350 is tripped and conditions established for changing over to record 103. This causes the bus relay BR to change over for energizing No. 2 head bus 454 and for de-energizing No. 1 head bus 453. As soon as No. 1 head bus 453 is de-energized by the tripping of the bus relay BR the source of energy for energizing record change relay 1RC is removed and this relay is de-energized. The de-energizing of record change relay 1RC also causes the main bus 452 to be de-energized and all further operation of the equipment is stopped. The equipment is now in a position such that the attendant may remove and replace records on the machine. At any time thereafter, the operator may again start the operation by pressing the foot switch 34. Thereupon the machine may be operated in the normal manner.

It should be noted that although we have described the record change in connection with head No. 1, the description applies equally as well to head No. 2. In case head No. 2 is in either the dictate or playback position and it is desired to change record 103, the attendant pushes the same record change push button 451. It will be noted that at this time the limit relay LR is in the XLR position so that the circuit 658 will be completed to record change relay 2RC instead of record change relay 1RC. This relay 2RC then establishes its own holding circuit which extends from the normally energized bus 460 through circuit 666 to the main bus 452 and through circuit 639 to No. 2 head bus 454. From the No. 2 head bus 454 energy flows through circuit 659 to record change relay 2RC as previously described. Since all the other connections for record change relay 2RC are identical with those of record change relay 1RC except that the contacts of relay 2RC are associated with No. 2 head instead of No. 1 head, the No. 2 head is caused to move to the neutral position, the carriage 115 to move in the "Y" direction and changeover to record 102 made in a manner similar to that described in connection with the record change for No. 1 head.

Summary

It will be noted that we have provided a dictating machine 30 which is adapted to be positioned remotely from the operator, and which may be positioned at a place where it may be conveniently attended by an attendant in the office. We have also provided in connection with the machine 30 complete controlling and indicating equipment whereby the operator may know at all times the exact function being performed by the machine and the exact position of the recording and reproducing heads with respect to the records. The indicating devices include the indicating lights 56 and 57 which indicate the dictate and playback position of the recording heads and the position indicator 53 which indicates the longitudinal position of the heads with respect to the records. Indication of the operativeness of the machine is also obtained by the illumination of the dial on the indicating device 53 by means of the lamp 55. We have found that certain of these indicating devices are essential to the practical operation of a dictating machine which is placed at a position where it cannot be conveniently seen by the operator. Unless the operator has some means of knowing the exact function being performed by the machine and the exact position of the recording heads along the records, it would be very difficult for him to operate a machine of this type with any degree of practical satisfaction.

Simplicity in the operation of machine 30 is assured through the use of a single controlling device in the form of the push button 52. We have also found that in the practical operation of a machine of this type the providing of a single controlling device for moving the heads and controlling the functions being performed by the machine is extremely desirable, as a plurality of controlling devices are extremely confusing to an operator. It frequently happens when more than one controlling device is provided that the wrong control device is operated which wastes time and interferes with the satisfactory operation thereof.

We have also reduced the number of motions which the operator must perform in order to control the movements of the heads. It will be noted that if one of the heads is in the dictate position, a single push on the control button 52 is effective in moving the head from the dictate position to neutral and backward along the record, a releasing of the button then is effective in moving the head from the neutral position to playback. With the head in playback position a single push on the control button 52 is effective in moving the head from the playback position to neutral and the releasing of the button is effective in causing the head to move along the record to the place where dictation was stopped and is further effective in moving it to the dictate position.

It should be noted that the equipment which we have provided makes the direction of travel of the head relative to the record an automatic function which does not require attention by the operator. For example, if the operator has been dictating and desires to play back a portion of the record, he does not have to consider which direction of movement the head should make relative to the record in order to reach the portion of the record which he wishes to play back. This feature is automatically taken care of in our machine and it is only necessary for the operator to push the control button 52 in order to start movement of the head in the proper direction. Likewise, if the operator has been playing back a portion of the record and wishes to dictate further he does not have to consider which direction the head should move relative to the record in order to reach the undictated portion of the record as this feature is automatically taken care of when control button 52 is depressed. While this feature is an advantage in connection with a single record machine in which the operator is positioned adjacent the machine, it is a necessity in connection with a multiple record machine which is positioned at a distance from the operator. It will be noted in connection with our machine, which possesses the above feature, that it is not necessary for the operator to know at any time which one of the records is being recorded and in fact we do not provide any indication for advising the operator which record is being recorded as this may confuse him. In our machine the directional movement of the carriage 115 is automatically taken care of and regardless of which record is being recorded the carriage will always move in the proper direction when the control button 52 is depressed by the operator.

Another extremely important device which we have provided is the position registering device. The position registering device which we have provided and the control associated therewith make it impossible, prior to the completion of the records, for either of the recording styli to be lowered onto the records at a place on the record where dictation has previously been recorded. It should be noted that the only time the heads can be moved in the dictate position is when the contacts associated with the proper head and with the position registering device are in engagement. Referring to the control for No. 1 head, it will be noted that the only time the "on" coil of relay IF can be energized with the No. 1 head in the neutral position is when the circuits 510 or 511 are completed. Since the normally open contact of relay IPR is included in both of these circuits, the contacts 336 and 338 of the position registering device 276 must therefore be engaged before the head 116 can be lowered to the dictate position. The same statement holds true for No. 2 head.

It is further possible to move the heads along the records at high speed to the exact point at which dictation was stopped and move the heads in the dictate position without leaving a large portion of the records undictated. It will be noted that when the heads are moved along the record to the place where dictation was stopped and the contacts of the position registering device are engaged, certain relays are energized which open the circuit to the high speed clutch 159. This removes all driving power from the advancing screw 128 and we propose to make the parts associated with the advancing screw 128 of low moment of inertia so that as soon as the driving power is removed from the advancing screw 128 it will stop rotating almost instantly. Whatever slight extra rotation of the advancing screw 128 occurs, can be made so small that the head can be moved into contact with the record at substantially the same point where dictation was stopped. This device accordingly provides for the greatest economy in dictating on the records and prevents dual recording on the records. Such a device is also quite essential in a remotely controlled dictating machine as it is practically impossible for the operator to set the machine at the exact point where the dictating was stopped by means of any indicating device such as the position indicating device 53 which indicates to him the position of the heads relative to the length of the records. We have found that a position registering device which is moved as a function of the exact movement of the head along the record can be made very accurate in its operation.

We have also provided in the machine 30, dual records and dual recording equipment, but only one set of control and indicating devices, and have provided means whereby the control and indicating devices may be alternately connected to the recording equipment. Such a system provides for rapid dictation by the operator, inasmuch as the time necessary to change from dictating on one record to dictating on another record is very short. Such a system provides means whereby an attendant may change records on the machine as they are dictated without interfering with dictation by the operator.

We have also provided in connection with a remotely controlled dictating machine, a system whereby the attendant may easily remove dictated records from the machine. It should be noted that this system is extremely simple for the attendant to operate as it is only necessary for him to depress the record change push button 451. The mechanical movement of the head and carriage is then automatically completed and the operator may change the record at any time after the head has been raised from the record. In the preferred form this is approximately one second after the operator has pressed the record change push button 451. However, other shifting speeds may be used satisfactorily and the time consumed may be reduced accordingly. We have purposely made the changing of records on the machine a very simple task so that it can be performed by unskilled attendants.

A further important consideration is in the providing of the time delay relay TDR which operates in conjunction with the foot switch 34. This time delay relay TDR provides means whereby the operator may easily put the equipment in operative condition, but prevents the posibility of leaving the machine in the energized position for an indefinite length of time. This is important in the economic operation of the machine as it prevents the wearing out of the equipment and the wasting of power.

We have provided certain other novel features of mechanical construction and electrical connections of the equipment. Certain of these novel features of construction together with certain others will be more fully set forth in connection with the appended claims.

From the foregoing description taken in connection with the accompanying drawings, advantages of the construction and method of operation will be readily understood by those skilled in the art to which the invention appertains, and while we have described the principle of operation, together with the device which we now consider to be the best embodiment thereof, we desire to have it understood that the device shown is merely illustrative and that such changes may be made, when desired, as fall within the scope of the appended claims.

We claim as our invention:

1. In a dictating machine, the combination of: a recording medium; a recording means operable to form a sound track on said recording medium; motor driven shift means for moving said translation means relative to said recording medium between a recording and a non-recording position; drive means for advancing said recording means and said recording medium relative to each other to form said sound track, and for retracting; means operated by said drive means and in proportion to said advancing movement during formation of said sound track to define the point of farthest advance of said sound track; a pair of electrical contacts cooperating with said point defining means and said recording means and engageable in response to advancing movement of said recording means to a position coincident with the point of farthest advance of said sound track; and relay means controlled by engagement of said electrical contacts for actuating said motor driven shift means to shift said recording means to said recording position.

2. In a dictating machine, the combination of: a recording medium; a translation means operable in a recording position to record by transmitting to said recording medium material for record and operable in a reproducing position to reproduce said recorded material; means for mounting said translation means for movement between said reproducing and said recording positions; shift means for moving said translation means from said reproducing to said recording position; drive means for advancing said translation means and said recording medium relative to each other to record said material; a primary electrical contact; means coupling said contact to said drive means for movement over a predetermined path and in proportion to advancing movement of said translation means; a secondary electrical contact; means mounting said secondary contact in said path for engagement by said primary electrical contact and for movement thereby during said advancing movement to define the point of farthest advance of said translation means; and relay means operated by said engagement of said primary and said secondary electrical contacts to operate said shift means.

3. In a dictating machine, the combination of: a recording medium; a translation means operable in a recording position to record by transmitting to said recording medium material for record and operable in a reproducing position to reproduce said recorded material; means for mounting said translation means for movement between said reproducing and recording positions; shift means for moving said translation means from said reproducing to said recording positions; drive means for advancing said translation means and said recording medium relative to each other to record said material; a primary electrical contact; means coupling said contact to said drive means for movement over a predetermined path and in proportion to advancing movement of said recording means; a secondary electrical contact; means mounting said secondary electrical contact in said path for engagement by said primary electrical contact and for movement thereby during said advancing movement to define the point of farthest advance of said recording means; and relay means operated by said engagement of said primary and said secondary electrical contacts to operate said shift means and to stop said drive means.

4. In a dictating machine, for operation by an operator, the combination of: a recording medium; a recording means operable to form a sound track on said recording medium; shift means for moving said translation means relative to said recording medium between a recording and a nonrecording position; drive means for advancing said translation means and said recording medium relative to each other to form said sound track; means operated by said drive means and in proportion to said advancing movement during formation of said sound track to define the point of farthest advance of said sound track; and means cooperating with said point defining means, and operatively responsive to advancing movement of said translation means to a position coincident with the point defined by said point defining means, for stopping said drive means and for controlling said shift means to shift said translation means from said non-operating position to said recording position.

5. In a dictating machine, for operation by an operator, the combination of: a recording medium; a recording means operable to form a sound track on said recording medium; motor driven shift means for moving said recording means relative to said recording medium between a recording and a non-recording position; electrical drive means for advancing said recording means and said recording medium relative to each other to form said sound track; means operated by said drive means and in proportion to said advancing movement during formation of said sound track to define the point of farthest advance of said sound track; a pair of electrical contacts cooperating with said point defining means and said recording means and engageable in response to advancing movement of said recording means to a position coincident with the point defined by said point defining means; and relay means controlled by engagement of said electrical contacts for stopping said drive means and for controlling said shift means to shift said recording means from said non-recording position to said recording position.

6. In a dictating machine, the combination of: a recording medium; a translation means operable to record by transmitting to said recording medium material for record and operable to reproduce said recorded material; electrical drive means for advancing said translation means and said recording medium relative to each other and for retracting; motor driven shift means for alternately moving said translation means relative to said recording medium between a recording, a non-operating, and a reproducing position; an electrical switch operable to each of two positions to control said motor driven shift means; a relay actuated by said switch in the first of said control positions to operate said shift means to move said translation means from said recording to said non-operating position and to start said electrical drive means; and another relay actuated by said control means in the second of said control positions to operate said shift means to move said translation means from said non-operating position to said reproducing position.

7. In a dictating machine, the combination of: a recording medium; a translation means operable to record by transmitting to said recording medium material for record and operable to reproduce said recorded material; electrical drive means for advancing said translation means and said recording medium relative to each other, and for retracting; motor driven shift means for moving said translation means relative to said recording medium between a recording, a non-operating and a reproducing position; an electrical switch movable to each of two positions to control said shift means; a relay actuated by said switch in the first of said control positions to operate said shift means to move said translation means from said recording to said non-operating position and to start said drive means; and another relay actuated by said switch in the second of said control positions to stop said drive means.

8. In a dictating machine, the combination of: a recording medium; a translation means operable to record by transmitting to said recording medium material for record and operable to reproduce said recorded material; an electrical drive means for advancing said translation means and said recording medium relative to each other, and for retracting; motor driven shift means for moving said translation means relative to said recording medium between a recording, a non-operating and a reproducing position; an electrical switch movable to each of two positions to control said shift means; a relay actuated by said control means in the first of said control positions to operate said shift means to move said translation means from said recording to said non-operating position and to start said drive means; and another relay actuated by said control means in the second of said control positions to operate said shift means to move said translation means from said non-operating position to said reproducing position and to stop said drive means.

9. In a dictating machine, the combination of: a recording medium; a translation means operable to record by transmitting to said recording medium, material for record and operable to reproduce said recorded material; shift means for moving said translation means relative to said recording medium between a recording position, a neutral non-operating position, and a reproducing position; drive means for advancing said translation means and said recording medium relative to each other; a control means operable to control the operation of said shift means for movement of said translation means between said reproducing position and said non-operating position and operable to start said drive means; and means operatively responsive to arrival of said translation means at a predetermined point relative to said recording medium for controlling said shift means to shift said translation means from said non-operating position to said recording position.

10. In a dictating machine, the combination of: a recording medium; a translation means operable to record by transmitting to said recording medium, material for record and operable to reproduce said recorded material; motor driven shift means for moving said translation means relative to said recording medium between a recording position, a neutral non-operating position and a reproducing position; electrical drive means for advancing said translation means and said recording medium relative to each other; an electrical switch operable to control the operation of said shift means for movement of said translation means between said reproducing position and said non-operating position and operable to control the starting of said drive means; and relay means operatively responsive to arrival of said translation means at a predetermined point relative to said recording medium for controlling said shift means to shift said translation means from said non-operating position to said recording position.

11. In a dictating machine, the combination of: a recording medium; a translation means operable to record by transmitting to said recording medium, material for record and operable to reproduce said recorded material; shift means for moving said translation means relative to said recording medium between a recording position, a neutral non-operating position and a reproducing position; drive means for advancing said translation means and said recording medium relative to each other; a control means operable to control the operation of said shift means for movement of said translation means between said reproducing position and said non-operating position and operable to start said drive means; and means operatively responsive to arrival of said translation means at a predetermined point relative to said recording medium for stopping said drive means and for controlling said shift means to shift said translation means from said non-operating position to said recording position.

12. In a dictating machine, the combination of: a recording medium; a translation means operable to record by transmitting to said recording medium, material for record and operable to reproduce said recorded material; motor driven shift means for moving said translation means relative to said recording medium between a recording position, a neutral non-operating position and a reproducing position; electrical drive means for advancing said translation means and said recording medium relative to each other; an electrical switch operable to control the operation of said shift means for movement of said translation means between said reproducing position and said non-operating position and operable to control the starting of said drive means; and relay means operatively responsive to arrival of said translation means at a predetermined point relative to said recording medium for controlling the stopping of said drive means and for controlling said shift means to shift said translation means from said non-operating position to said recording position.

13. In a dictating machine, the combination of: a recording medium; a translation means operable to record by transmitting to said recording medium material for record and operable to reproduce said recorded material; shift means for moving said translation means relative to said recording medium between a recording position, a neutral non-operating position and a reproducing position; drive means for advancing said translation means and said recording medium relative to each other; means operated by said drive means and in proportion to said advancing movement during recording to define the point of farthest advance of said translation means; a control means operable to control the operation of said shift means for movement of said translation means between said reproducing position and said non-operating position and operable to start said drive means; and means cooperating with said point defining means, and operatively responsive to arrival of said translation means at a position coincident with the point defined by said point defining means for controlling said shift means to shift said translation means from said non-operating position to said recording position.

14. In a dictating machine, the combination of: a recording medium; a translation means operable to record by transmitting to said recording medium material for record and operable to reproduce said recorded material; motor driven shift means for moving said translation means relative to said recording medium between a recording position, a neutral non-operating position and a reproducing position; electrical drive means for advancing said translation means and said recording medium relative to each other; means operated by said drive means and in proportion to said advancing movement during recording to define the point of farthest advance of said translation means; an electrical switch operable to control the operation of said shift means for movement of said translation means between said reproducing position and said non-operating position and operable to start said drive means; a pair of electrical contacts cooperating with said point defining means and said translation means and engageable in response to arrival of said translation means at a position coincident with the point defined by said point defining means; and relay means controlled by engagement of said electrical contacts for controlling said shift means to shift said translation means from said non-operating position to said recording position.

15. In a dictating machine, the combination of: a recording medium; a translation means operable to record by transmitting to said recording medium material for record and operable to reproduce said recorded material; shift means for moving said translation means relative to said recording medium between a recording position, a neutral non-operating position and a reproducing position; drive means for advancing said translation means and said recording medium relative to each other; means operated by said drive means and in proportion to said advancing movement during recording to define the point of farthest advance of said translation means; a control means operable to control the operation of said shift means for movement of said translation means between said reproducing position and said non-operating position and operable to start said drive means; and means cooperating with said point defining means, and operatively responsive to arrival of said translation means at a position coincident with the point defined by said point defining means, for stopping said drive means.

16. In a dictating machine, the combination of: a recording medium; a translation means operable to record by transmitting to said recording medium material for record and operable to reproduce said recorded material; motor driven shift means for moving said translation means relative to said recording medium between a recording position, a neutral non-operating position and a reproducing position; electrical drive means for advancing said translation means and said recording medium relative to each other; means operated by said drive means and in proportion to said advancing movement during recording to define the point of farthest advance of said translation means; an electrical switch operable to control the operation of said shift means for movement of said translation means between said reproducing position and said non-operating position and operable to start said drive means; a pair of electrical contacts cooperating with said point defining means and said translation means and engageable in response to arrival of said translation means at a position coincident with the point defined by said point defining means; and relay means controlled by engagement of said electrical contacts for stopping said drive means.

17. In a dictating machine, the combination of: a recording medium; a translation means operable to record by transmitting to said recording medium material for record and operable to reproduce said recorded material; shift means for moving said translation means relative to said recording medium between a recording position, a neutral non-operating position and a reproducing position; drive means for advancing said translation means and said recording medium relative to each other; means operated by said drive means and in proportion to said advancing movement during recording to define the point of farthest advance of said translation means; a control means operable to control the operation of said shift means for movement of said translation means between said reproducing position and said non-operating position and operable to start said drive means; and means cooperating with said point defining means, and operatively responsive to arrival of said translation means at a position coincident with the point defined by said point defining means, for stopping said drive means and for controlling said shift means to shift said translation means from said non-operating position to said recording position.

18. In a dictating machine, the combination of: a recording medium; a translation means operable to record by transmitting to said recording medium material for record and operable to reproduce said recorded material; motor driven shift means energizable to move said translation means relative to said recording medium between a recording position, a neutral non-operating position, and a reproducing position; electrical drive means for advancing said translation means and said recording medium relative to each other; means operated by said drive means and in proportion to said advancing movement during recording to define the point of farthest advance of said translation means; an electrical switch operable to control the energization of said shift means for movement of said translation means between said reproducing position and said non-operating position and operable to start said drive means; and a pair of electrical contacts cooperating with said point defining means and said translation means and engageable in response to arrival of said translation means at a position coincident with the point defined by said point defining means, for operating said electrical switch to stop said drive means and energize said shift means to shift said translation means from said non-operating position to said recording position.

19. In a dictating machine, for operation by an operator at a position remote therefrom, the combination of: a recording medium; a recording means operable to transmit to said recording medium material for record; motor driven shift means for moving said recording means relative to said recording medium from a non-recording to a recording position; drive means for advancing said recording means and said recording medium relative to each other to record said material, and for retracting; means operated by said drive means and in proportion to said advancing movement to define the point of farthest advance of said recording means; a pair of electrical contacts cooperating with said point defining means and said recording means and engageable in response to advancing movement of said recording means to a position coincident with the point defined by said point defining means; indicating means adjacent said operator; and relay means operated by engagement of said electrical contacts for actuating said shift means and operating said indicating means for indicating the movement of said recording means to said recording position.

20. In a dictating machine, the combination of: a recording medium; a recording means operable to transmit to said recording medium material for record; means for mounting said recording means for movement relative to said recording medium between a recording and a non-recording position; drive means for advancing said recording means and said recording medium relative to each other to record said material, and for retracting; means operated by said drive means and in proportion to said advancing movement to define the point of farthest advance of said recording means; a pair of electrical contacts cooperating with said point defining means; means mounting said electrical contacts for movement relative to each other from one position when said recording means is in said position of farthest advance to another position when said recording means is retracted from said position of farthest advance; and an electrically actuated locking means operated through movement of said contacts to said first named position to lock said recording means in said non-recording position when said recording means is retracted, and operated through movement of said contacts to said other position to unlock said recording means when said recording means is again advanced to a position coincident with the point defined by said point defining means.

21. In a dictating machine, the combination of: a recording medium; a recording means operable to record by transmitting to said recording medium material for record; means for mounting said recording means for movement relative to said recording medium between a recording and a non-recording position; drive means for advancing said recording means and said recording medium relative to each other to record said material, and for retracting; a primary electrical contact; means coupling said contact to said drive means for movement over a predetermined path proportional to advancing movement of said recording means; a secondary electrical contact; means mounting said secondary electrical contact in said path for engagement by said primary electrical contact and for movement thereby during said advancing movement to define the point of farthest advance of said recording means; and locking means operatively responsive to disengagement of said primary and said secondary electrical contacts during said retracting movement of said recording means for locking said recording means in said non-recording position and releasable in response to advancing movement of said recording means back to a position re-engaging said primary and said secondary electrical contacts.

22. In a dictating machine, the combination of: a recording medium; a recording means operable to transmit to said recording medium material for record; shifting mechanism including an electric motor energizable to move said recording means relative to said recording medium between a recording and a non-recording position; drive means for advancing said recording means and said recording medium relative to each other to record said material, and for retracting; means operated by said drive means and in proportion to said advancing movement to define the point of farthest advance of said recording means; a pair of electrical contacts cooperating with said point defining means; means mounting said electrical contacts for movement relative to each other from a closed position when said recording means is advanced to said point defined by said point defining means to an open position when said recording means is retracted; and electrical relay means operable through movement of said contacts to said open position to energize said electric motor to shift said recording means to said non-recording position and to thereafter render said electric motor inoperative to thereby lock said recording means in said non-recording position when retracted, said electrical relay means being operable through movement of said contacts to said closed position to energize said electric motor to shift said recording means to said recording position when said recording means is again advanced to a position coincident with the point defined by said point defining means.

23. In a dictating machine, the combination of: a recording medium; a recording means operable to record by transmitting to said recording medium material for record; means for mounting said recording means for movement relative to said recording medium between a recording and a non-recording position; shift means for moving said recording means to said recording position; drive means for advancing said recording means and said recording medium relative to each other to record said material, and for retracting; a primary electrical contact; means coupling said contact to said drive means for movement over a predetermined path and in proportion to advancing movement of said recording means; a secondary electrical contact; means mounting said secondary electrical contact in said path for engagement by said primary electrical contact and for movement thereby during said advancing movement to define the point of farthest advance of said recording means; locking means operatively responsive to disengagement of said primary and said secondary electrical contacts during said retracting movement of said recording means for locking said recording means in said non-recording position and releasable in response to advancing movement of said recording means back to a position reengaging said primary and said secondary electrical contacts; and a relay means operated by said engagement of said primary and said secondary electrical contacts to operate said shift means.

24. In a dictating machine, the combination of: a recording medium; a recording means operable to form a sound track on said recording medium; a drive means for advancing said recording means and said recording medium relative to each other to form said sound track, and for retracting; means operated by said drive means and in proportion to said advancing movement to define the point of farthest advance of said sound track; and control means cooperating with said point defining means and operatively responsive to said advancing movement of said recording means to a position coincident with the point of farthest advance of said sound track for limiting the advance of said recording means to the limit of said sound track.

25. In a dictating machine, the combination of: a recording medium; a recording means operable to form a sound track on said recording medium; an electric motor drive means operable to advance said recording means and said recording medium relative to each other to form said sound track and for retracting; means defining an advancing circuit for connecting said electric motor drive means to a source of power for advancing movement; means operated by said drive means and in proportion to said advancing movement to define the point of farthest advance of said sound track; electrical contacts cooperating with said point defining means and said recording means and engageable in response to advancing movement of said recording means to a position coincident with the point of farthest advance of said sound track; and relay means operated by the engagement of said contacts for opening said advancing circuit of said drive means to limit the advance of said recording means to the limit of said sound track.

26. In a dictating machine, the combination of: a recording medium; a recording means operable to transmit to said recording medium material for record; a drive means selectively operable at a plurality of speeds for advancing said recording means and said recording medium relative to each other to record said material, and for retracting; means operated by said drive means and in proportion to said advancing movement to define the point of farthest advance of said recording means; and means cooperating with said point defining means and operatively responsive to arrival of said recording means at a position coincident with the point defined by said point defining means to limit the further advancing movement of said drive means to one of said drive speeds.

27. In a dictating machine, the combination of: a recording medium; a recording means operable to transmit to said recording medium material for record; a drive means electrically operable at a plurality of speeds for advancing said recording means and said recording medium relative to each other to record said material; means defining a high speed advancing circuit for connecting said drive means to a source of power for high speed advancing movement; means defining a slow speed advancing circuit for connecting said electric motor drive means to a source of power for slow speed advancing movement; means operated by said drive means and in proportion to said advancing movement to define the point of farthest advance of said sound track; electrical contacts cooperating with said point defining means and said recording means and engageable in response to advancing movement of said recording means to a point coincident with the point of farthest advance of said sound track; and relay means operated by the engagement of said contacts for opening said high speed advancing circuit of said drive means to limit the further advancing movement of said drive means to said slow speed.

28. In a dictating machine, the combination of: a recording medium; a recording means operable to transmit to said recording medium material for record; drive means selectively operable at a plurality of speeds for advancing said recording means and said recording medium relative to each other, and for retracting; a primary electrical contact; means coupling said primary electrical contact to said drive means, for movement over a predetermined path and in proportion to advancing movement of said recording means; a secondary electrical contact; means mounting said secondary electrical contact in said predetermined path for engagement by said primary electrical contact and for movement thereby during said advancing movement to define the point of farthest advance of said recording means; and a relay means operated by said engagement of said primary and said secondary electrical contacts to limit the further advancing movement of said drive means to one of said drive speeds.

29. In a dictating machine, the combination of: a recording medium; a recording means operable to form a sound track on said recording medium; drive means selectively operable at a plurality of speeds for advancing said recording means and said recording medium relative to each other to form said sound track, and for retracting; means operated by said drive means and in proportion to said advancing movement during formation of said sound track to define the point of farthest advance of said sound track; and means cooperating with the point defining means and operatively responsive to the arrival of said recording means at a position coincident with said point defined by said point defining means to limit the operation of said drive means to one of said drive speeds for advancing movement of said recording means beyond said point of farthest advance of said sound track.

30. In a dictating machine, the combination of: a recording medium; a translation means operable to record by transmitting to said recording medium material for record and operable to reproduce said recorded material; drive means for advancing said translation means and said recording medium relative to each other to record said material, and for retracting; a primary electrical contact; means coupling said contact to said drive means for movement over a predetermined path and in proportion to advancing movement of said translation means; a secondary electrical contact; means mounting said secondary electrical contact in said path for engagement by said primary electrical contact and for movement thereby during said advancing movement to define the point of farthest advance of said translation means; and relay means operated by disengagement of said primary and said secondary electrical contacts to limit the operation of said translation means to reproducing when retracted, and operated by engagement of said primary and said secondary electrical contacts to limit the operation of said translation means to recording.

31. In a dictating machine, the combination of: a recording medium; a recording means operable to transmit to said recording medium material for record; a drive means for advancing said recording means relative to said recording medium from the beginning toward the end thereof when recording said material; means operated by said drive means and in proportion to said advancing movement to define the point of farthest advance of said recording means; a returning means coupled to said point defining means for returning said point defining means to the beginning of said recording medium; and means positioned at a predetermined point along said recording medium and cooperating with said point defining means for actuating said returning means when said recording means has moved to said predetermined point.

32. In a dictating machine, the combination of: a recording medium; a recording means operable to transmit to said recording medium material for record; a drive means for advancing said recording means relative to said recording medium from the beginning toward the end thereof when recording said material; means operated by said drive means and in proportion to said advancing movement to define the point of farthest advance of said recording means; a returning means coupled to said point defining means for returning said point defining means to the beginning of said recording medium; an electric motor for operating said returning means; a switch means for controlling said electric motor; and means positioned at a predetermined point along said recording medium and cooperating with said point defining means for actuating said switch means when said recording means has moved to said predetermined point.

33. In a dictating machine, the combination of: a recording medium; a recording means operable to transmit to said recording medium material for record; drive means for advancing said recording means and said recording medium relative to each other to record said material, and for retracting; point defining means operated by said drive means and in proportion to said advancing movement to define the point of farthest advance of said recording means; means mounting said point defining means for movement relative to said recording means to a non-operating position in which said point defining means is operated in proportion to both said advancing and said retracting movement of said recording means; locking means to lock said point defining means in said non-operating position; and means operatively responsive to arrival of said recording means at a predetermined position relative to said recording medium to actuate said locking means and start said retracting movement of said drive means.

34. In a dictating machine, the combination of: a recording medium; a recording means operable to transmit to said recording medium material for record; drive means for advancing said recording means and said recording medium relative to each other to record said material, and for retracting; point defining means operated by said drive means and in proportion to said advancing movement to define the point of farthest advance of said recording means; means for mounting said point defining means for movement relative to said recording means to a non-operating position in which said point defining means is operated in proportion to both said advancing and said retracting movement of said recording means; locking means to lock said point defining means in said non-operating position; control means operable to start said advancing movement of said drive means and to actuate said locking means; and means operatively responsive to arrival of said recording means at a predetermined position relative to said recording medium to start said retracting movement of said drive means.

35. In a dictating machine, the combination of: a recording medium; a recording means operable to transmit to said recording medium material for record; means for mounting said recording means for movement relative to said recording medium between a recording and a non-recording position; drive means for advancing said recording means and said recording medium relative to each other to record said material; means operated by said drive means and in proportion to said advancing movement to define the point of farthest advance of said recording means; a pair of electrical contacts cooperating with said point defining means and said recording means and engageable in response to advancing movement of said recording means to a position coincident with the point defined by said point defining means; motor driven shift means normally actuated by said electrical contacts when said recording means arrives at a position coincident with the point defined by said point defining means for normally shifting said recording means to said recording position; and control means operable to render said electrical contacts ineffective to operate said shift means, to allow said recording means to advance beyond said point without recording.

36. In a dictating machine, the combination of: a recording medium; a recording means operable to transmit to said recording medium material for record; means for mounting said recording means for movement relative to said recording medium between a recording and a nonrecording position; a drive means for advancing said recording means and said recording medium relative to each other to record said material; a primary electrical contact; means coupling said contact to said drive means for movement over a predetermined path and in proportion to said advancing movement of said recording means; a secondary electrical contact; means mounting said secondary contact in said path for engagement by said primary electrical contact and for movement thereby during said advancing movement to define the point of farthest advance of said recording means; shift means normally operable upon completion of an electrical circuit by engagement of said primary and said secondary electrical contacts for normally shifting said recording means to said recording position; and means for interrupting said electrical circuit to render said contacts ineffective to operate said shift means, to allow said recording means to advance beyond said point of farthest advance without recording.

37. In a dictating machine, the combination of: a recording medium; a recording means operable to transmit to said recording medium material for record; drive means for moving said recording medium; regulating means for alternately rendering said recording means operable and inoperable; control means coacting with said drive means and said regulating means and operable to one position to start said drive means and render said recording means operable and operable to another position to stop said drive means and render said recording means inoperable; and means cooperating with said regulating means and said control means for maintaining said recording means operable for a predetermined length of time after actuation of said control means to said other position.

38. In a dictating machine, the combination of: a recording medium; an electrically actuated recording means operable to transmit to said recording medium material for record; electric motor drive means for moving said recording medium; regulating means for alternately rendering said recording means for recording and operable and inoperable; switch means coacting with said drive means and said regulating means and operable to one position to start said electric motor drive means and to render said recording means operable and operable to another position to stop said electric motor drive means and to render said recording means inoperable; and means cooperating with said regulating means and said control means for delaying the operation of said regulating means to thereby maintain said recording means operable for a predetermined length of time after operation of said switch means to said other position.

39. In a dictating machine, the combination of: a movable recording medium; a drive means for moving said recording medium; a source of power for operating said drive means; an indicator connected to said source of power for indicating when said source is in condition to supply power to said drive means; control means for coupling said source of power to said drive means to move said recording medium; means intermittently actuated in response to movement of said recording medium for intermittently actuating said indicating means to indicate movement of said recording medium; and means actuated in response to movement of said control means to a position to disconnect power from said drive means for rendering said intermittent means inoperable to control said indicating means.

40. In a dictating machine, the combination of: a movable recording medium; a drive means for moving said recording medium; a source of power for the operation of said drive means; a connecting means to connect and disconnect said source of power to said drive means to move said recording medium; a contact means intermittently opened and closed in response to movement of said recording medium for intermittently deenergizing said indicator to indicate movement of said recording medium; and switch means actuated in response to operation of said connecting means to a position to disconnect said power from said drive means for rendering said intermittent contact means inoperative to deenergize said indicator means.

41. In a dictating machine, the combination of: a recording medium; a translation means operable to record by transmitting to said recording medium material for record and operable to reproduce said recorded material; a drive means for advancing said translation means relative to said recording medium toward one end thereof; a control means to control the operation of said drive means; indicating means responsive to arrival of said translation means at a predetermined point near said end of said recording medium and operable to indicate the arrival of said translation means at said point; and means independent of said control means and cooperating with said drive means and responsive to operation of said indicating means for continuing the operation of said drive means until said translation means passes said predetermined point.

42. In a phonograph, a carriage movable relatively to a record tablet and supporting a recording stylus movable into record engaging position, means for feeding the carriage in an advancing direction, a device operable simultaneously to render inoperative said carriage feeding means and to control movement of said recording stylus into record engaging position, a member movable continuously with said carriage during advance of the carriage and adapted to remain at the position of farthest advance when said carriage is moved backwardly from such advanced position, and operating means for said device comprising coacting elements on said carriage and said member adapted to cause operation of said device when said carriage returns to its position of farthest advance.

43. In a phonograph, a record tablet, a carriage movable in an advancing direction relatively to said record tablet, an instrument adapted to translate sound vibrations into electrical impulses and to translate electrical impulses into sound vibrations, a recorder on said carriage normally engaging said record tablet and normally operatively connected with said instrument, a reproducer on said carriage normally out of engagement with said record tablet and normally unconnected with said instrument, means for effecting backspacing of said carriage, shifting means operable to disengage the recorder and engage the reproducer with the record tablet, means automatically operable in response to operation of said backspacing means to effect operation of said shifting means, and also to disconnect the recorder and connect the reproducer with said instrument, whereby reproduction takes place during subsequent advancing movement of the carriage over the portion of the record tablet traversed during a backspacing movement, and means operable by the carriage substantially upon completion of said advancing movement for automatically effecting restoration of the recorder and reproducer to normal condition.

44. In a phonograph, a carriage mounted to advance or backspace in relation to a record tablet, an instrument adapted to translate sound vibrations into electric impulses and to translate electric impulses into sound vibrations, an electric recorder and an electric reproducer on said carriage alternatively adapted to be connected in circuit with said instrument, means for backspacing said carriage, means for connecting said reproducer with said instrument, control means manually operable in all advanced positions of said carriage to effect backspacing and coincidentally to effect connection of said reproducer with said instrument, and means movable to various positions in respect to said carriage for effecting connection of said reproducer with said instrument automatically when occupying any other than one predetermined position relative to said carriage.

45. In a phonograph, a carriage mounted to advance or backspace in relation to a record tablet, an instrument adapted to translate sound vibrations into electric impulses and to translate electric impulses into sound vibrations, an electric recorder and an electric reproducer on said carriage alternatively adapted to be connected in circuit with said instrument, means for backspacing said carriage, means for controlling the operation of said backspacing means, shifting means adapted upon operation of said control means to connect said reproducer with said instrument, a member engageable by said carriage and movable continuously therewith during the advance thereof, and means associated with said member and inactively conditioned during engagement of said carriage with said member adapted, in case said carriage is moved away from said member, to cooperate with said shifting means to connect said reproducer with said instrument.

46. In a phonograph, a carriage mounted to advance or backspace in relation to a record tablet, an instrument adapted to translate sound vibrations into electric impulses and to translate electric impulses into sound vibrations, an electric recorder and an electric reproducer on said carriage alternatively adapted to be connected in circuit with said instrument, means for backspacing said carriage, means for controlling the operation of said backspacing means, shifting means adapted upon operation of said control means to connect said reproducer with said instrument, a member movable continuously to define the farthest advance of said carriage, and means associated with said member adapted after operation of said backspace control means to cooperate with said shifting means to maintain the circuit connections between said reproducer and said instrument during advancing movement of the carriage over the portion of the record tablet traversed during a backspacing movement.

47. In a phonograph, a carriage mounted to advance or backspace in relation to a record tablet, an instrument adapted to translate sound vibrations into electric impulses and to translate electric impulses into sound vibrations, an electric recorder and an electric reproducer on said carriage alternatively adapted to be connected in circuit with said instrument, means for backspacing said carriage, means for controlling the operation of said backspacing means, shifting means adapted upon operation of said control means to connect said reproducer with said instrument, a member movable continuously to define the farthest advance of said carriage, means associated with said member adapted after operation of said backspace control means to cooperate with said shifting means to maintain the circuit connections between said reproducer and said instrument during advancing movement of the carriage over the portion of the record tablet traversed during a backspacing movement, and means adapted to cooperate with said means associated with said member for automatically conditioning the shifting means to restore the recorder connection with said instrument during an advancing movement of said carriage after the same has traversed the said portion of the record tablet.

48. In a phonograph, a carriage adapted to advance and retreat along a path in operative relation to a record tablet and provided with a reproducing stylus movable into record engaging position, means for feeding the carriage in the direction of advance, a device operable to render operative said carriage feeding means and to control movement of said reproducing stylus into record engaging position, a member movable with said carriage during the advance of the carriage and adapted to remain at the position of farthest advance when said carriage is caused to retreat from such position, operating means for said device, means adapted to render said operating means ineffective while said member is conditioned for movement with said carriage and to permit operation of said operating means when said carriage is moved backwardly from its position of farthest advance.

49. In a phonograph, a carriage adapted to advance and retreat along a path in operative relation to a record tablet and provided with a reproducing stylus movable into record engaging position, means for feeding the carriage in the direction of advance, a device operable to render operative said carriage feeding means and to control movement of said reproducing stylus into record engaging position, a member movable with said carriage during the advance of the carriage and adapted to remain at the position of farthest advance when said carriage is caused to retreat from such position, operating means for said device, means adapted to render said operating means ineffective while said member is conditioned for movement with said carriage and to permit operation of said operating means when said carriage is moved backwardly from its position of farthest advance, and remotely controlled means adapted to effect backward movement of said carriage and to operate said device when said carriage is in its position of farthest advance.

50. In a phonograph, a carriage movable relatively to a record tablet and supporting a reproducing stylus movable into record engaging position, means for feeding the carriage in an advancing direction, a device operable to render operative said carriage feeding means and to control movement of said reproducing stylus into record engaging position, a member adapted alternatively to move with said carriage or to occupy a position of rest in spaced relation to said carriage, operating means for said device carried by said member, and means on said carriage adapted to render said operating means inoperative when said member is conditioned to move with said carriage and to permit operation of said operating means when said member stands in spaced relation to said carriage.

RAY M. CHENOWETH.
EMMETT M. IRWIN.
WALTER P. HUNTLEY.

CERTIFICATE OF CORRECTION.

Patent No. 2,277,207. March 24, 1942.

RAY M. CHENOWETH, ET AL.

It is hereby certified that error appears in the printed specification of the above numbered patent requiring correction as follows: Page 31, first column, line 52, claim 38, strike out the words "for recording and"; and that the said Letters Patent should be read with this correction therein that the same may conform to the record of the case in the Patent Office.

Signed and sealed this 16th day of June, A. D. 1942.

(Seal)

Henry Van Arsdale,
Acting Commissioner of Patents.